(12) United States Patent
Soliman, Sr. et al.

(10) Patent No.: US 9,042,218 B2
(45) Date of Patent: May 26, 2015

(54) APPARATUS, METHOD, AND SYSTEM FOR INCENTIVIZING OPEN ACCESS TO CLOSED SUBSCRIBER GROUP LOW-POWER BASE STATIONS

(71) Applicant: QUALCOMM Incorporated, San Diego, CA (US)

(72) Inventors: Samir Salib Soliman, Sr., Poway, CA (US); Bongyong Song, San Diego, CA (US); Xiaolong Huang, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 13/789,650

(22) Filed: Mar. 7, 2013

(65) Prior Publication Data

US 2014/0254355 A1 Sep. 11, 2014

(51) Int. Cl.
*H04L 12/26* (2006.01)
*H04W 28/08* (2009.01)
*G06Q 30/02* (2012.01)

(52) U.S. Cl.
CPC ............ *H04W 28/08* (2013.01); *G06Q 30/0207* (2013.01)

(58) Field of Classification Search
CPC ..................................................... H04W 28/08
USPC ........................................................ 370/229
See application file for complete search history.

(56) References Cited

U.S. PATENT DOCUMENTS

| | | |
|---|---|---|
| 8,103,310 B1 | 1/2012 | Srinivas et al. |
| 8,311,005 B2 | 11/2012 | Sundaresan et al. |
| 2002/0075844 A1 | 6/2002 | Hagen |
| 2008/0261602 A1 | 10/2008 | Livneh |
| 2010/0254319 A1* | 10/2010 | Karaoguz et al. ............. 370/329 |
| 2012/0094658 A1 | 4/2012 | Macias et al. |
| 2013/0053048 A1* | 2/2013 | Garcia et al. .................. 455/450 |

FOREIGN PATENT DOCUMENTS

WO WO-2012022965 A2 2/2012

OTHER PUBLICATIONS

International Search Report and Written Opinion—PCT/US2014/019619—ISA/EPO—Oct. 14, 2014.
Partial International Search Report—PCT/US2014/019619—ISA/EPO—Aug. 22, 2014.

* cited by examiner

*Primary Examiner* — Sai-Ming Chan
(74) *Attorney, Agent, or Firm* — Loza & Loza LLP

(57) ABSTRACT

Apparatus and methods are disclosed that provide various incentive schemes for owners of low-power base stations to allow others nearby to use their base station, enabling off-loading of some users from a nearby macrocell, thus helping improve overall network performance. For example, a "win-win" scenario might exist when a sharing opportunity at a low-power base station overlaps with a sharing opportunity at the neighboring macrocell. During this overlap, when the low-power base station provides access to its air interface to one or more UEs outside of a set of UEs associated with the low-power base station, an incentive credit may be received. Incentive credits can take various forms, and in some examples, may be in an amount that is a function of an amount of contribution to the network resulting from the provision of access to the air interface.

52 Claims, 12 Drawing Sheets

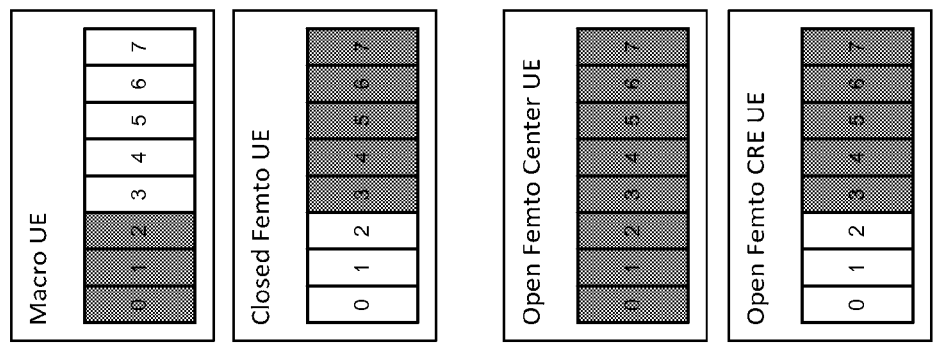
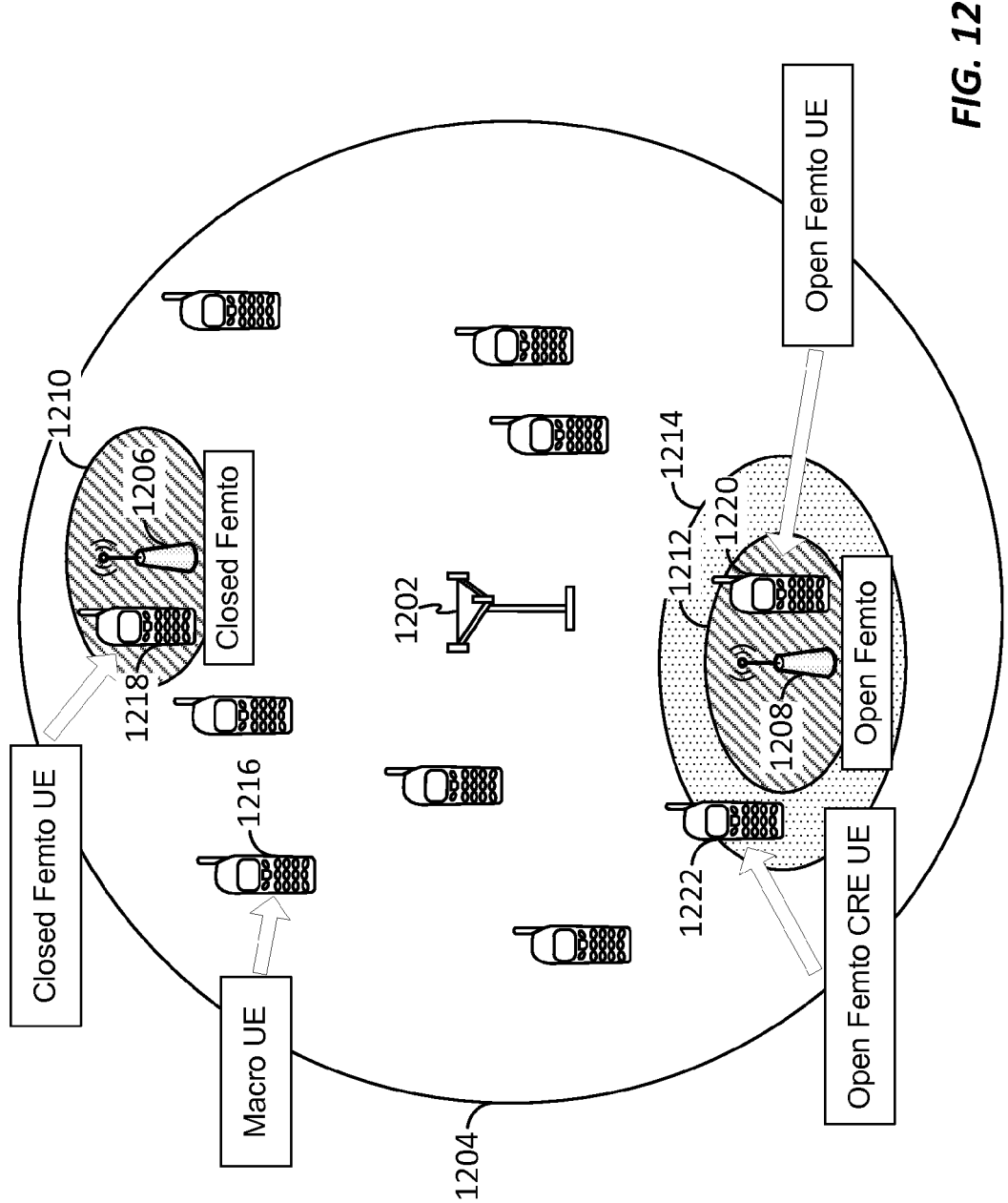
FIG. 12

APPARATUS, METHOD, AND SYSTEM FOR INCENTIVIZING OPEN ACCESS TO CLOSED SUBSCRIBER GROUP LOW-POWER BASE STATIONS

TECHNICAL FIELD

Aspects of the present disclosure relate generally to wireless communication systems, and more particularly, to heterogeneous networks including closed subscriber group low-power base stations.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

Recently, heterogeneous networks have been an area of intense interest due to their promise of improved wireless coverage in otherwise difficult-to-cover areas like train stations, tunnels, office buildings, and homes. A heterogeneous network includes conventional high-power macrocells, as well as various low-power nodes or small cells such as microcells, picocells, and femtocells, with varying capacities, coverage areas, and power capabilities.

As the demand for mobile broadband access continues to increase, research and development continue to advance heterogeneous network technology not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Broadly, various apparatus and methods are disclosed that provide various incentive schemes for owners of low-power base stations to allow others nearby to use their base station, enabling offloading of some users from a nearby macrocell, thus helping improve overall network performance. For example, a "win-win" scenario might exist when a sharing opportunity at a low-power base station overlaps with a sharing opportunity at the neighboring macrocell. During this overlap, when the low-power base station provides access to its air interface to one or more UEs outside of a set of UEs associated with the low-power base station, an incentive credit may be received. Incentive credits can take various forms, and in some examples, may be in an amount that is a function of an amount of contribution to the network resulting from the provision of access to the air interface.

In one aspect, the disclosure provides a method of wireless communication operable at a low-power base station. Here, the method includes the steps of determining that a sharing opportunity exists at the low-power base station, determining that a sharing opportunity exists at a neighboring macrocell, providing access to an air interface provided by the low-power base station to a user equipment (UE) outside of a set of UEs associated with the low-power base station, and receiving an incentive credit responsive to the providing of access to the air interface.

Another aspect of the disclosure provides a method for incentivizing the provision of access to a low-power base station. Here, the method includes the steps of receiving, from a first low-power base station, a list of one or more UEs associated with the first low-power base station, transmitting, from a second low-power base station, usage information corresponding to a grant of access, at the second low-power base station, to a UE from among the one or more UEs associated with the first low-power base station, and receiving an incentive credit responsive to the grant of access to the UE associated with the first low-power base station.

Another aspect of the disclosure provides a low-power base station configured for wireless communication, including means for determining that a sharing opportunity exists at the low-power base station, means for determining that a sharing opportunity exists at a neighboring macrocell, means for providing access to an air interface provided by the low-power base station to a user equipment (UE) outside of a set of UEs associated with the low-power base station, and means for receiving an incentive credit responsive to the providing of access to the air interface.

Another aspect of the disclosure provides a low-power base station configured for incentivizing the provision of access to the low-power base station, including means for receiving, from a first low-power base station, a list of one or more UEs associated with the first low-power base station, means for transmitting, from a second low-power base station, usage information corresponding to a grant of access, at the second low-power base station, to a UE from among the one or more UEs associated with the first low-power base station, and means for receiving an incentive credit responsive to the grant of access to the UE associated with the first low-power base station.

Another aspect of the disclosure provides a low-power base station configured for wireless communication, including at least one processor, a memory communicatively coupled to the at least one processor, and a communication interface communicatively coupled to the at least one processor for communicating with one or more user equipment (UE) over an air interface. Here, the at least one processor is configured to determine that a sharing opportunity exists at the low-power base station, to determine that a sharing opportunity exists at a neighboring macrocell, to provide access to the air interface to a UE outside of a set of UEs associated with the low-power base station, and to receive an incentive credit responsive to the providing of access to the air interface.

Another aspect of the disclosure provides a low-power base station configured for incentivizing the provision of access to the low-power base station, including at least one processor, a memory communicatively coupled to the at least one processor, a communication interface communicatively coupled to the at least one processor for communicating with one or more user equipment (UE) over an air interface, and an intra-femto communication interface for communicating with one or more external low-power base stations. Here, the at least one processor is configured to receive, from a first low-power base station, a list of one or more UEs associated with the first low-power base station, to transmit, from a second low-power base station, usage information corresponding to a grant of access, at the second low-power base station, to a UE from among the one or more UEs associated with the first low-power base station, and to receive an incentive credit responsive to the grant of access to the UE associated with the first low-power base station.

Another aspect of the disclosure provides a computer-readable storage medium operable at a low-power base station configured for wireless communication, including instructions for causing a computer to determine that a sharing opportunity exists at the low-power base station, instructions for causing a computer to determine that a sharing opportunity exists at a neighboring macrocell, instructions for causing a computer to provide access to the air interface to a UE outside of a set of UEs associated with the low-power base station, and instructions for causing a computer to receive an incentive credit responsive to the providing of access to the air interface.

Another aspect of the disclosure provides a computer-readable storage medium operable at a low-power base station configured for incentivizing the provision of access to the low-power base station, including instructions for causing a computer to receive, from a first low-power base station, a list of one or more UEs associated with the first low-power base station, instructions for causing a computer to transmit, from a second low-power base station, usage information corresponding to a grant of access, at the second low-power base station, to a UE from among the one or more UEs associated with the first low-power base station, and instructions for causing a computer to receive an incentive credit responsive to the grant of access to the UE associated with the first low-power base station.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 12 is a schematic illustration of an incentive scheme utilizing eICIC and range extension in accordance with an aspect of the disclosure.

DETAILED DESCRIPTION

Figure 1:
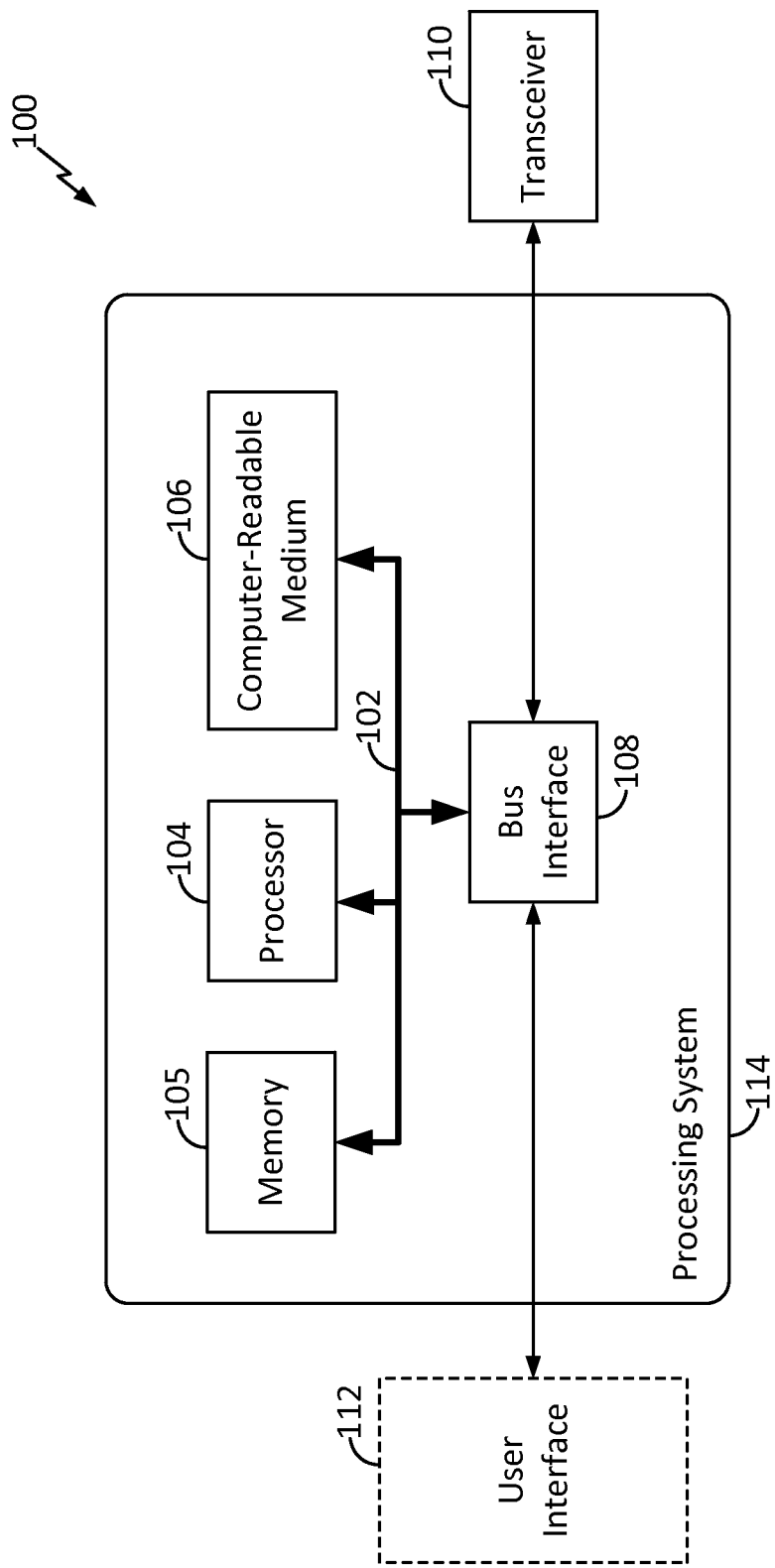
FIG. 1 is a block diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Heterogeneous networks have recently become popular as one effective solution for network operators to improve overall network performance by offloading some of the capacity from centralized, high-power base stations, to a larger number of distributed low-power base stations. In general, a heterogeneous network is a cellular network where service is provided not only by high-power base stations (frequently called macrocells), but also by various types of low-power base stations, frequently called microcells, picocells, or femtocells.

Among these, a femtocell is a low-power base station that is typically used indoors, e.g., within the home or in an office. While the wireless air interface for communication with mobile devices uses the same protocols as conventional macrocells, albeit at a lower power, unlike a macrocell the backhaul connection for communication with the operator's network utilizes a broadband Internet connection, such as through a cable or DSL modem. Femtocells provide many advantages, including improved wireless coverage indoors, reduced interference by virtue of the lower power transmissions, as well as enabling some of the network traffic to be offloaded from the macrocells to the low-power cells.

In existing literature, a femtocell may be referred to as a small cell, a low-power cell, a Home Node B (HNB), Home eNode B (HeNB), Femtocell Access Point (FAP) Small Cell Access Point (SCAP), etc. Although details are provided below utilizing femtocells as an explanatory example, aspects of the disclosure may be applied to any of various forms of heterogeneous networks, which may or may not include femtocells, but include any one or more types of low-power cells capable of offloading some of the capacity of macrocells. For example, a picocell (or microcell) is a relatively small and low-cost base station typically deployed to extend coverage from that available from a macrocell deployment, e.g., into buildings, malls, train stations, etc., where coverage from macro-cells may otherwise be lacking. Aspects of the disclosure may equivalently be applied to such microcells or picocells.

While femtocells have been deployed to some extent in existing networks, for various reasons some of the benefits that might come about from their use have not resulted. For example, privately owned femtocells as used today are typically closed access, configured such that only the owner of the femtocell, and in some cases, a predetermined set of authorized users, is authorized to access the network utilizing the air interface provided by the femtocell. That is, the owner/subscriber pays for their backhaul capacity and for the electricity to power the femtocell, and may lack incentives to allow freeloading on service provided by their own equipment Therefore, some aspects of the disclosure provide various incentive schemes for owners of femtocells to allow others nearby to use their femtocell, enabling offloading of some users from the macrocell and helping improve overall network performance.

FIG. 1 is a conceptual diagram illustrating an example of a hardware implementation for an apparatus 100 employing a processing system 114. In various examples, described below, the apparatus 100 may represent an access terminal (user equipment), a base station (e.g., a Node B, a femtocell, etc.), or other apparatus. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The various concepts presented throughout this disclosure may be implemented across a broad variety of telecommunication systems, network architectures, and communication standards. In any particular wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between a mobile user equipment (UE) and the core network, and may include circuit switched and packet switched protocols. The AS provides the lower layers, for signaling between the access network and the UE, and may include a user plane and a control plane. Here, the user plane or data plane carries user traffic, while the control plane carries control information (i.e., signaling).

Figure 2:
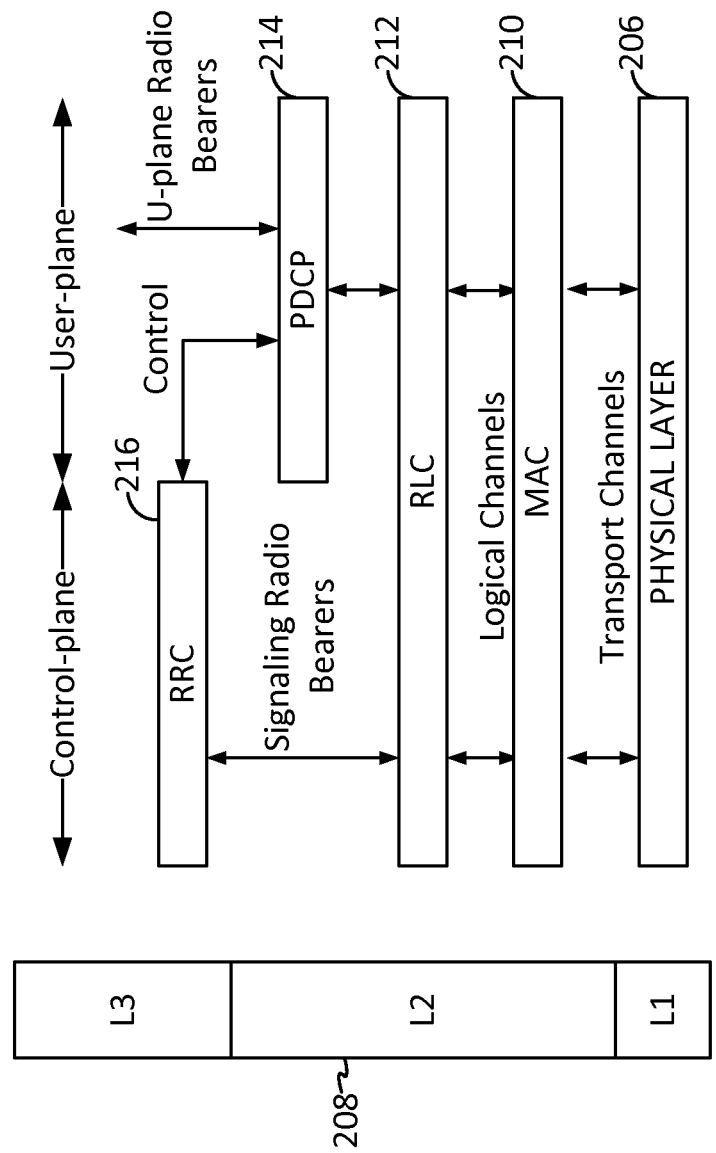
FIG. 2 is a conceptual diagram illustrating an example of a radio protocol architecture for the user and control plane.

Turning to FIG. 2, the AS is shown with three layers: Layer 1, Layer 2, and Layer 3. Layer 1 is the lowest layer and implements various physical layer signal processing functions. Layer 1 will be referred to herein as the physical layer 206. The data link layer, called Layer 2 208, is above the physical layer 206 and is responsible for the link between the UE 210 and Node B 208 over the physical layer 206.

At Layer 3, the RRC layer 216 handles the control plane signaling between the UE 210 and the Node B 208. RRC layer 216 includes a number of functional entities for routing higher layer messages, handling broadcasting and paging functions, establishing and configuring radio bearers, etc.

In the illustrated diagram, the L2 layer 208 is split into sublayers. In the control plane, the L2 layer 208 includes two sublayers: a medium access control (MAC) sublayer 210 and a radio link control (RLC) sublayer 212. In the user plane, the L2 layer 208 additionally includes a packet data convergence protocol (PDCP) sublayer 214. Although not shown, the UE may have several upper layers above the L2 layer 208 including a network layer (e.g., IP layer) that is terminated at a PDN gateway on the network side and an application layer that is terminated at the other end of the connection (e.g., far end UE, server, etc.).

The PDCP sublayer 214 provides multiplexing between different radio bearers and logical channels. The PDCP sublayer 214 also provides header compression for upper layer data packets to reduce radio transmission overhead, security by ciphering the data packets, and handover support for UEs between Node Bs.

The RLC sublayer 212 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 210 provides multiplexing between logical and transport channels. The MAC sublayer 210 is also responsible for allocating the various radio resources (e.g., resource blocks) in one cell among the UEs. The MAC sublayer 210 is also responsible for HARQ operations.

Figure 3:
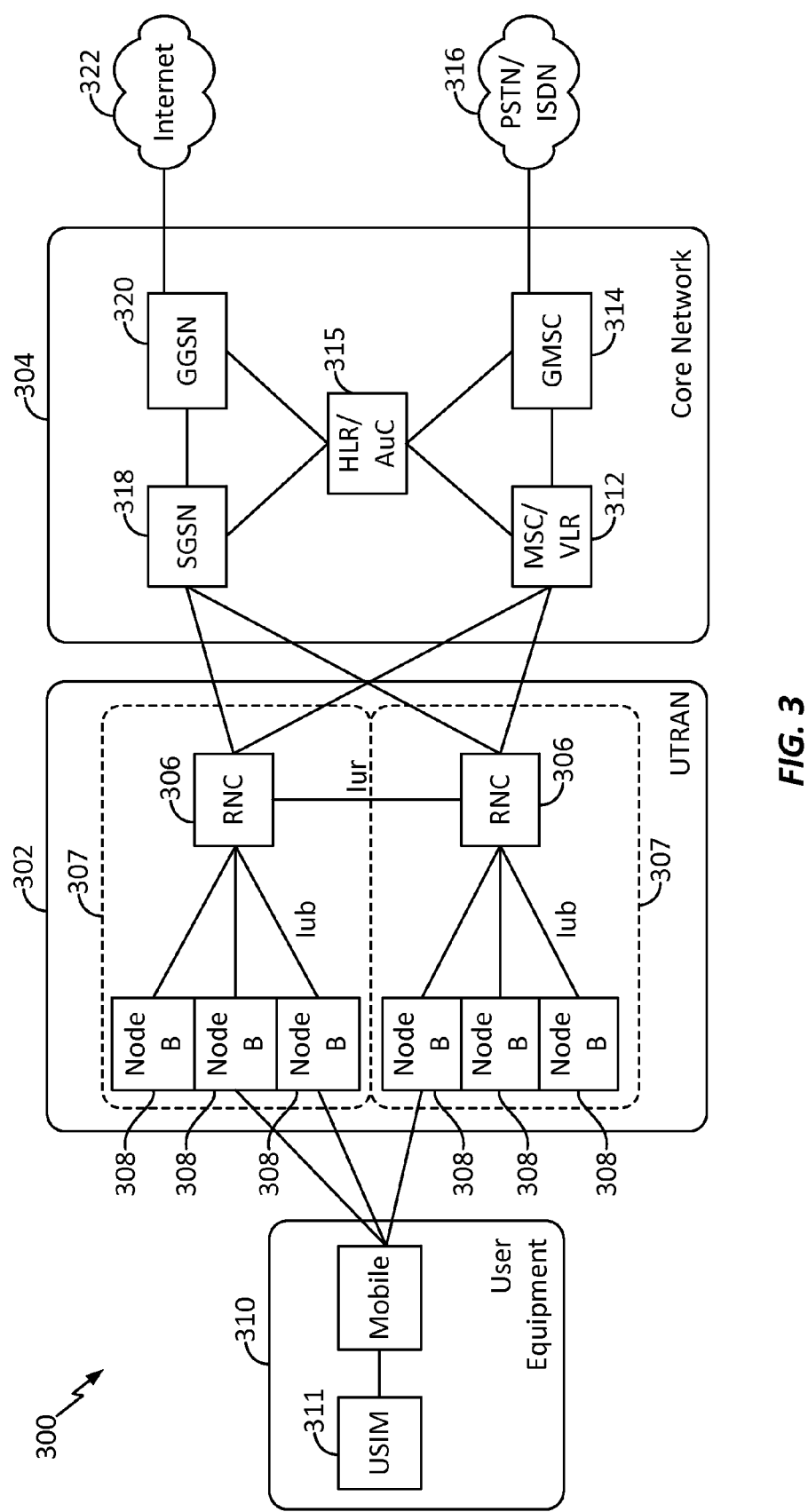
FIG. 3 is a block diagram conceptually illustrating an example of a telecommunications system.

Referring now to FIG. 3, as an illustrative example without limitation, various aspects of the present disclosure are illustrated with reference to a Universal Mobile Telecommunications System (UMTS) network 300. A UMTS network includes three interacting domains: a core network 304, a radio access network (RAN) (e.g., the UMTS Terrestrial Radio Access Network (UTRAN)) 302, and a user equipment (UE) 310. Among several options available for a UTRAN 302, in this example, the illustrated UTRAN 302 may employ a W-CDMA air interface for enabling various wireless services including telephony, video, data, messaging, broadcasts, and/or other services. The UTRAN 302 may include a plurality of Radio Network Subsystems (RNSs) such as an RNS 307, each controlled by a respective Radio Network Controller (RNC) such as an RNC 306. Here, the UTRAN 302 may include any number of RNCs 306 and RNSs 307 in addition to the illustrated RNCs 306 and RNSs 307. The RNC 306 is an apparatus responsible for, among other things, assigning, reconfiguring, and releasing radio resources within the RNS 307. The RNC 306 may be interconnected to other RNCs (not shown) in the UTRAN 302 through various types of interfaces such as a direct physical connection, a virtual network, or the like using any suitable transport network.

The geographic region covered by the RNS 307 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 308 are shown in each RNS 307; however, the RNSs 307 may include any number of wireless Node Bs. The Node Bs 308 provide wireless access points to a core network 304 for any number of mobile apparatuses. In a heterogeneous network, examples of a Node B 308 may include a macrocell, a microcell, a picocell, or a femtocell, while examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 310 may further include a universal subscriber identity module (USIM) 311, which contains a user's subscription information to a network. For illustrative purposes, one UE 310 is shown in communication with a number of the Node Bs 308. The downlink (DL), also called the forward link, refers to the communication link from a Node B 308 to a UE 310 and the uplink (UL), also called the reverse link, refers to the communication link from a UE 310 to a Node B 308.

The core network 304 can interface with one or more access networks, such as the UTRAN 302. As shown, the core network 304 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 304 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 304 supports circuit-switched services with a MSC 312 and a GMSC 314. In some applications, the GMSC 314 may be referred to as a media gateway (MGW). One or more RNCs, such as the RNC 306, may be connected to the MSC 312. The MSC 312 is an apparatus that controls call setup, call routing, and UE mobility functions. The MSC 312 also includes a visitor location register (VLR) that contains subscriber-related information for the duration that a UE is in the coverage area of the MSC 312. The GMSC 314 provides a gateway through the MSC 312 for the UE to access a circuit-switched network 316. The GMSC 314 includes a home location register (HLR) 315 containing subscriber data, such as the data reflecting the details of the services to which a particular user has subscribed. The HLR is also associated with an authentication center (AuC) that contains subscriber-specific authentication data. When a call is received for a particular UE, the GMSC 314 queries the HLR 315 to determine the UE's location and forwards the call to the particular MSC serving that location.

The illustrated core network 304 also supports packet-switched data services with a serving GPRS support node (SGSN) 318 and a gateway GPRS support node (GGSN) 320. General Packet Radio Service (GPRS) is designed to provide packet-data services at speeds higher than those available with standard circuit-switched data services. The GGSN 320 provides a connection for the UTRAN 302 to a packet-based network 322. The packet-based network 322 may be the Internet, a private data network, or some other suitable packet-based network. The primary function of the GGSN 320 is to provide the UEs 310 with packet-based network connectivity. Data packets may be transferred between the GGSN 320 and the UEs 310 through the SGSN 318, which performs primarily the same functions in the packet-based domain as the MSC 312 performs in the circuit-switched domain.

As discussed above, the UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 302 is based on such DS-CDMA technology and additionally calls for a frequency division duplexing (FDD). FDD uses a different carrier frequency for the uplink (UL) and downlink (DL) between a Node B 408 and a UE 310. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

Figure 4:
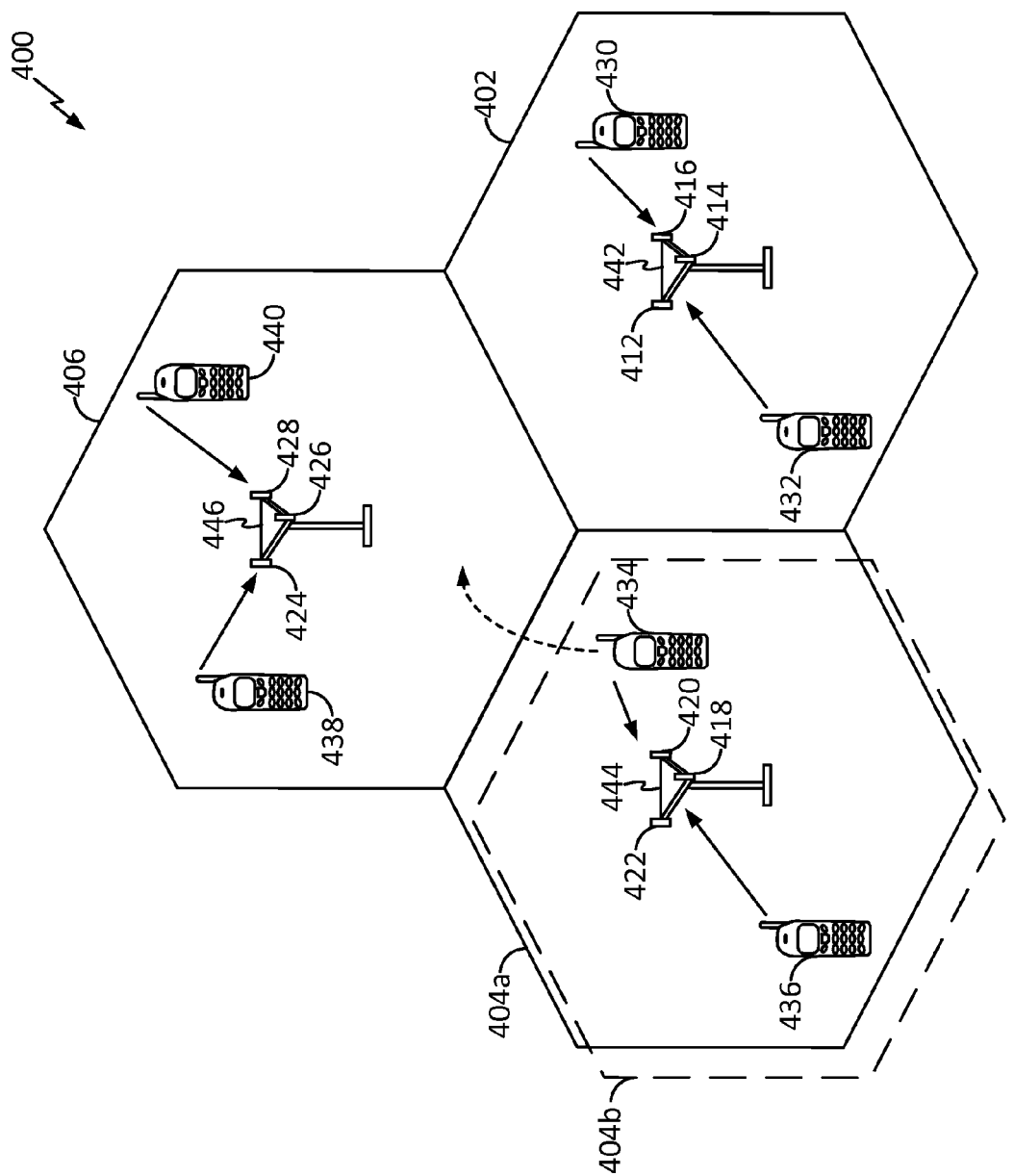
FIG. 4 is a conceptual diagram illustrating an example of an access network.

Referring now to FIG. 4, by way of example and without limitation, a simplified schematic illustration of a RAN 400 in a UTRAN architecture is illustrated. The system includes multiple cellular regions (cells), including cells 402, 404, and 406, each of which may include one or more sectors. Cells may be defined geographically (e.g., by coverage area) and/or may be defined in accordance with a frequency, scrambling code, etc. That is, the illustrated geographically-defined cells 402, 404, and 406 may each be further divided into a plurality of cells, e.g., by utilizing different scrambling codes. For example, cell 404a may utilize a first scrambling code, and cell 404b, while in the same geographic region and served by the same Node B 444, may be distinguished by utilizing a second scrambling code.

While the illustrated cells are shown in FIG. 4 as having the same sizes, this is merely a schematic illustration; and in a heterogeneous network, wherein the Node Bs 442, 444, and 446 may vary in terms of their power, capacity, or other characteristics, and as described above, may be macrocells, microcells, picocells, or femtocells in accordance with implementation specifics.

In a cell that is divided into sectors, the multiple sectors within a cell can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 may each correspond to a different sector. In cell 406, antenna groups 424, 426, and 428 may each correspond to a different sector.

The cells 402, 404, and 406 may include several UEs that may be in communication with one or more sectors of each cell 402, 404, or 406. For example, UEs 430 and 432 may be in communication with Node B 442, UEs 434 and 436 may be in communication with Node B 444, and UEs 438 and 440 may be in communication with Node B 446. Here, each Node B 442, 444, and 446 may be configured to provide an access point to a core network 204 (see FIG. 2) for all the UEs 430, 432, 434, 436, 438, and 440 in the respective cells 402, 404, and 406.

During a call with a source cell, or at any other time, the UE 436 may monitor various parameters of the source cell as well as various parameters of neighboring cells. Further, depending on the quality of these parameters, the UE 436 may maintain communication with one or more of the neighboring cells. During this time, the UE 436 may maintain an Active Set, that is, a list of cells to which the UE 436 is simultaneously connected (i.e., the UTRAN cells that are currently assigning a downlink dedicated physical channel DPCH or fractional downlink dedicated physical channel F-DPCH to the UE 436 may constitute the Active Set).

Figure 5:
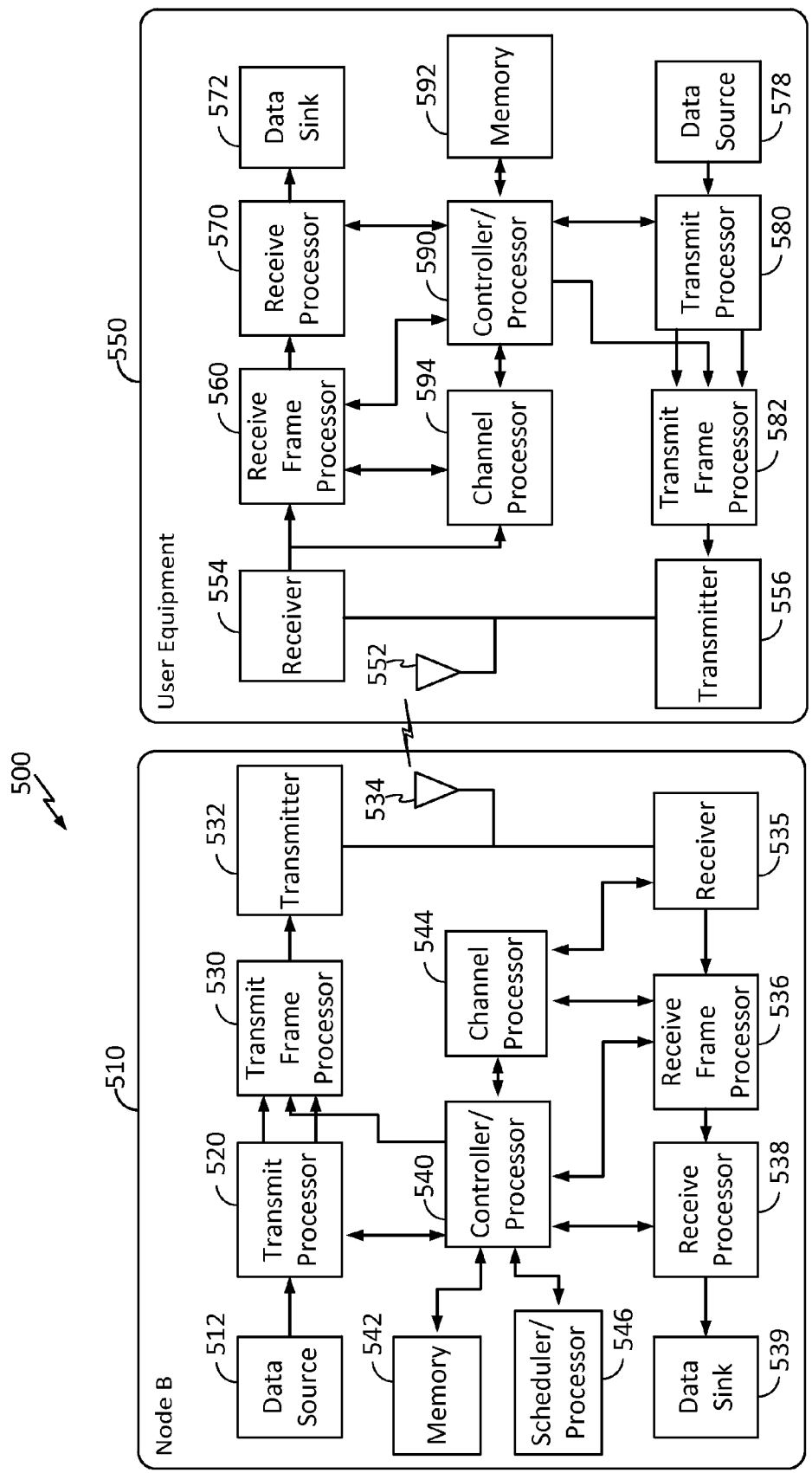
FIG. 5 is a block diagram conceptually illustrating an example of a Node B in communication with a UE in a telecommunications system.

FIG. 5 is a block diagram of an exemplary Node B 510 in communication with an exemplary UE 550. Here, the UE 550 may be the UE 310 in FIG. 3, and the Node B 510 may be the Node B 308 in FIG. 3, e.g., being embodied as a macrocell, a microcell, a picocell, and/or a femtocell, depending on the implementation. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor 538, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

As indicated above, one or more aspects of the disclosure provide an incentive scheme configured to motivate subscribers who own or control a femtocell to open up access to the air interface provided by that femtocell, to users outside an authorized set of users. In this way, greater numbers of femtocells may be opened up to additional users, easing potential overload conditions at neighboring macrocells, reducing interference, and providing other benefits to the network as a whole.

That is, as described below, a closed-access or closed subscriber group (CSG) femtocell may include a closed set of authorized UEs, wherein only UEs within that authorized set are allowed to utilize air interface resources provided by the femtocell. In accordance with one or more aspects of the disclosure, however, access to the air interface provided by the femtocell may be provided to one or more other UEs outside that authorized set of UEs, such that the femtocell becomes a hybrid-access femtocell (wherein at least one selected UE outside the authorized set of UEs is allowed access), or an open-access femtocell, wherein any nearby UE may utilize resources provided by the femtocell.

As described in further detail below, various types of incentives may be provided to a subscriber who owns and/or controls a femtocell. That is, incentives for subscribers to open up access to their femtocells are seen as desirable from the network standpoint, since without such incentives it is relatively unlikely that a subscriber would open up access to their femtocell. Here, the types of incentives may be usable by the subscriber for other than usage of their own femtocell, since in the case that the subscriber already pays for an unlimited data plan on their subscription, providing incentives relating to use of their own femtocell would likely be ineffective.

Furthermore, as described in further detail below, the algorithms and methods for determining the amount of incentives to give, and the timing of when such incentives may be available, may take several different forms. In some examples, femtocells may be enabled to communicate with one another, such that the incentives to provide to a subscriber may be determined by the femtocells in a distributed, coordinated manner.

In some examples, the determination of incentives to offer may consider both the operator's policy and the local policy set by the owner of the femtocell. In this way, access to the femtocells may be enabled at a time when there is little or no impact to the owner, while at the same time, the macrocell or other network entity is helped by the extra capacity provided by the open-access femtocell. This can enable a "win-win" strategy, wherein the operator's network and the subscriber both benefit from the shared access.

Figure 6:
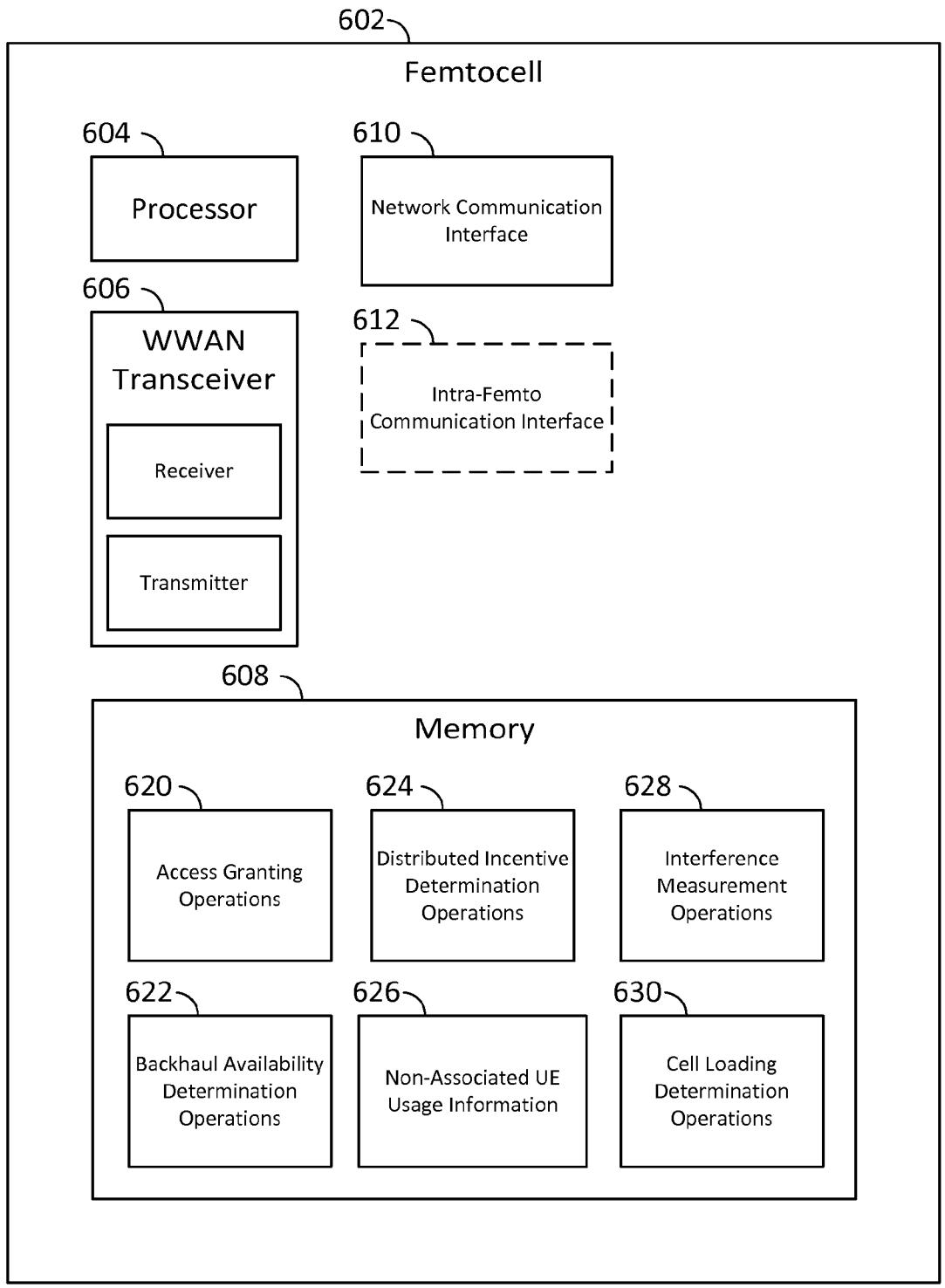
FIG. 6 is a simplified block diagram illustrating an example of a femtocell configured for opening up access responsive to incentive credits.

FIG. 6 is a schematic block diagram illustrating a femtocell 602 according to one or more aspects of the disclosure. In some examples, the femtocell 602 may represent the Node B 510 illustrated in FIG. 5, and/or the apparatus 100 illustrated in FIG. 1. As illustrated, the femtocell 602 includes at least one processor 604, a communications interface such as a WWAN transceiver 606 communicatively coupled to the at least one processor 604, and a memory 608 communicatively coupled to the at least one processor 604. Here, the WWAN transceiver 606 may be configured to provide the wireless air interface for communication with one or more UEs (e.g., the UE 550). Further, the femtocell 602 may include a network communication interface 610, which may be any suitable interface, such as an Ethernet port, a DSL interface, a cable modem interface, or other interface for connecting the femtocell 602 to a network, such as the Internet. The network communication interface 610 may provide backhaul communication for the femtocell 602, for example, acting as a source and/or sink for data communicated by way of the WWAN transceiver 606.

Determining Whether to Open Access

In various aspects of the disclosure, the femtocell 602 may not be involved in the calculation of whether to open its access, the decision being controlled by the network operator based on information received from the macrocell and/or the femtocell 602. In another aspect of the disclosure, the femtocell 602 may communicate with nearby macrocells, such that the opening of access can be coordinated with the rest of the network. Here, the femtocell 602 may utilize the network communication interface 610 to receive instructions to open up its access to one or more non-associated users. In yet another aspect of the disclosure, the femtocell 602 may utilize information it determines, and/or information received from neighboring macrocells and/or neighboring femtocells, to determine whether to open access to one or more non-associated UEs.

In a further aspect of the disclosure, the timing and other details of a femtocell 602 opening up access to one or more UEs outside the set of associated UEs, whether determined at the femtocell 602 or determined externally, may be determined in accordance with various factors. Here, one or more factors may correspond to the subscriber and/or the femtocell 602 itself, such as backhaul availability, interference at the femtocell, or other such factors that could affect the quality of service or quality of experience for the subscriber. For example, the femtocell 602 may include backhaul availability determination operations 622 configured to determine whether the backhaul, corresponding to the network communication interface 610, is loaded or has availability to accommodate the offloading of one or more non-associated users from a neighboring cell. Furthermore, the femtocell 602 may include interference measurement operations 628, which may be utilized to operate in coordination with the WWAN transceiver 606 to determine an amount of interference (e.g., a rise-over-thermal or RoT) caused by nearby users. Still further, the femtocell 602 may include cell loading determination operations 630, which may be utilized to determine loading conditions of the femtocell 602, which may correspond to one or more of a number of users utilizing the air interface provided by the WWAN transceiver 606, availability of the processor 604, backhaul availability corresponding to the network communication interface 610, or other aspects that may affect the loading or availability of resources at the femtocell 602.

Furthermore, one or more factors may correspond to the network operator, such as macrocell traffic loading, interference at the macrocell, or other such factors that could affect the quality of service or quality of experience for users of the macrocell network. The network may determine these factors utilizing any suitable means, and may communicate information regarding these factors to the femtocell 602, e.g., by way of the backhaul connection, utilizing the network communication interface 610.

In one or more aspects of the disclosure, a suitable time for opening up access to one or more UEs outside of the authorized set of UEs may be determined as described below.

Figure 7:
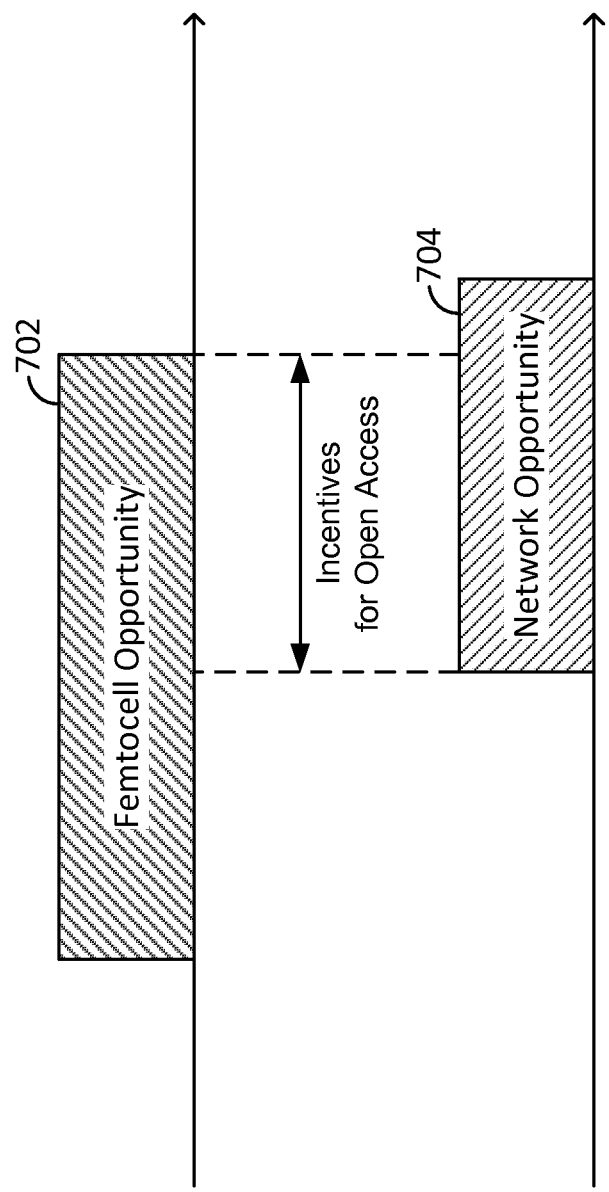
FIG. 7 is a timing diagram illustrating an overlap between femtocell sharing opportunities and network sharing opportunities for incentivizing open access to a femtocell according to one example.

FIG. 7 is a schematic timing diagram illustrating a timing for opening access, in accordance with one example. That is, the best time for a subscriber to open up access to their femtocell 602 for non-associated users corresponds to an overlap of a time when the provision of open access to the femtocell 602 would provide a benefit to the femtocell itself, as illustrated at the top timeline 702, as well as a benefit to the network, as illustrated at the bottom timeline 704. Such an opportunity 702 for the femtocell 602 may correspond to a time when the femtocell 602 has residual backhaul capacity available for use by others, or other suitable conditions such as the air interface interference or channel conditions corresponding to the WWAN transceiver 606. Further, such an opportunity 704 for the network may correspond to a time when the provision of open access to the femtocell 602 would provide a contribution to the network.

In this way, when open access is granted to the femtocell 602 during the overlapping time, e.g., when the incentives are offered to the subscriber, a win-win scenario can be achieved, wherein both the subscriber and the network can achieve benefits from the granting of the open access. That is, in accordance with an aspect of the disclosure, incentives may be provided to a subscriber at such a time that a "win-win" scenario can be achieved, wherein the incentive encourages the femtocell to open up access for others during a time when the window of good opportunities for the femtocell owner intersects with the window of good opportunities for the network.

Figure 8:
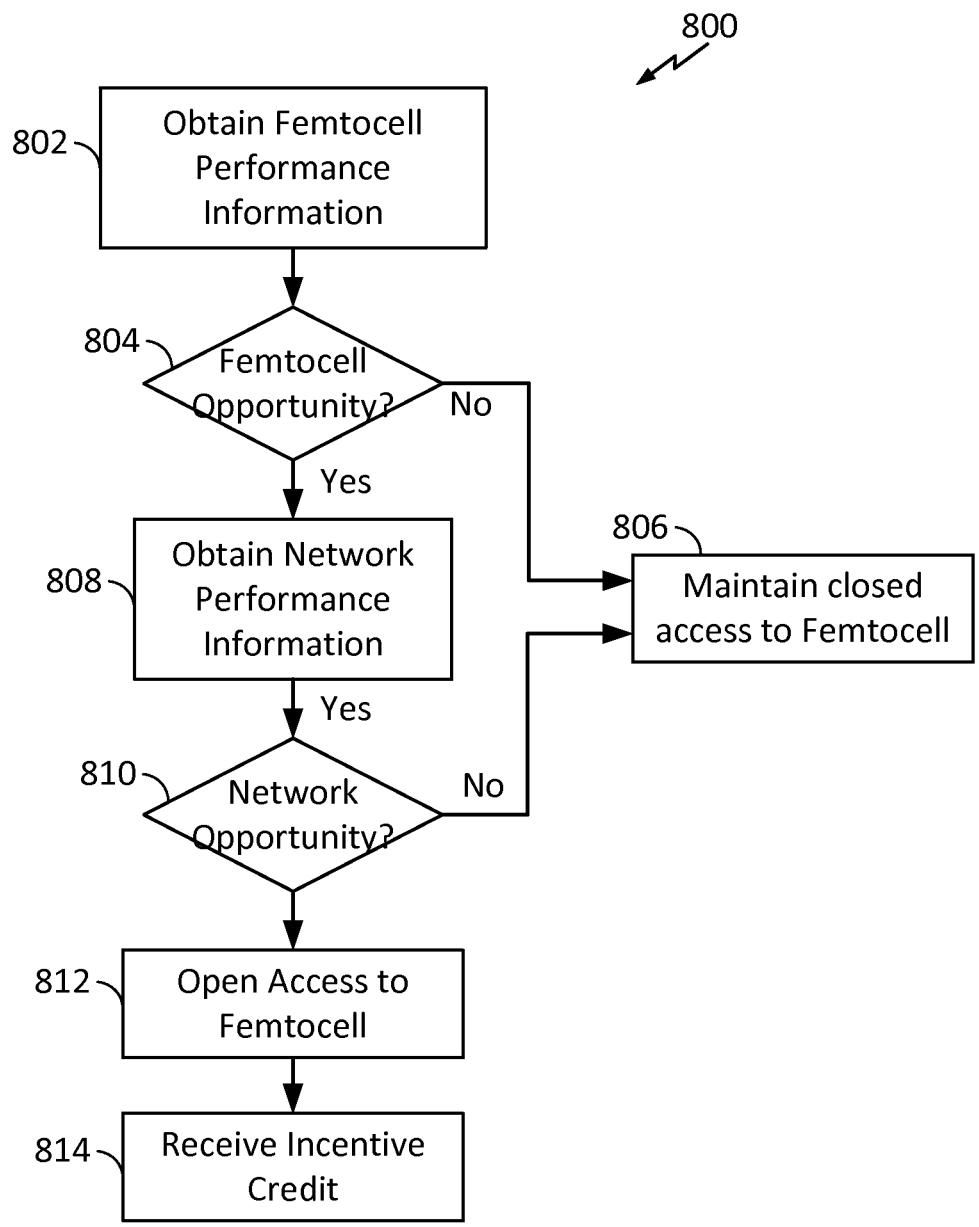
FIG. 8 is a flow chart illustrating a process of opening access to a femtocell responsive to incentives according to one example.

FIG. 8 is a flow chart illustrating an exemplary process 800 for granting an incentive to a subscriber corresponding to the femtocell 602 in accordance with an aspect of the disclosure. In some examples, the process 800 may be performed at a femtocell 602, e.g., when determining a distributed incentive; while in other examples, the process 800 may be performed at a suitable network node such as, referring to FIG. 3, a Node B 308, an RNC 306, a node in the core network 304, or a server communicatively coupled to a packet-switched network such as the Internet 322.

At step 802, the femtocell 602 may obtain femtocell performance information, which can inform the femtocell 602 as to whether a femtocell sharing opportunity 702 exists for either improved performance, or at least a lack of substantially degraded performance from the opening up of access to non-associated UE. For example, femtocell performance information may correspond to backhaul availability, which may be retrieved by inquiring to its network utilizing the network communication interface 610, or by making measurements of its own utilizing backhaul availability determination operations 622. That is, the subscriber may wish only to open up their private femtocell 602 during a time when residual backhaul capacity is available, such that opening up access to others would not harm the femtocell's performance for the subscriber.

Further, the femtocell performance information may correspond to channel conditions of the wireless network. For example, the WWAN transceiver 606 at the femtocell 602 may make measurements of traffic volume, as well as interference at a particular time, e.g., under the control of interference measurement operations 628.

Still further, the femtocell performance information may include information about users who might hand over from a nearby macrocell (or a nearby femtocell) to the femtocell 602. For example, information such as the number of users nearby who may hand over to the femtocell 602, identifying information of those users, whether those users have opened up access to their femtocells for use by the subscriber and/or associated users of the femtocell 602, what incentives or credits they have been granted for such opening up, etc., can be useful in determining the existence of a femtocell sharing opportunity 702 for opening up access, as described below. In some examples, the gathering of this information corresponding to nearby users may be implemented by one or both of the WWAN transceiver 606 in communication with the users' UEs or with nearby cells, or by inquiring to the network for this information utilizing the network communication interface 610.

In accordance with the femtocell performance information obtained at step 802, at step 804 the femtocell 602 may determine whether a sharing opportunity exists at the femtocell 602, such that opening up access to users outside the set of authorized users for the femtocell 602 is beneficial, or at least not substantially detrimental, to the subscriber. For example, the processor 604 may determine whether residual backhaul capacity, which might be made available to one or more non-associated UEs if open access is granted, is greater than a threshold (e.g., a predetermined backhaul capacity threshold). Additionally or alternatively, the processor 604 may determine whether the granting of access to nearby users would reduce interference to those users who are using the femtocell 602. For example, if one or more users of a nearby cell are causing a relatively large amount of undesired interference that adversely affects users of the femtocell 602, it may be beneficial to the users of the femtocell 602 to have those interfering users handover to the femtocell 602. Of course, other considerations may take place corresponding to the femtocell performance information obtained in step 802 to determine in step 804 whether the femtocell opportunity for opening up access exists.

If there is no such opportunity, then the process may proceed to step 806, wherein the femtocell 602 may maintain closed access, i.e., by providing access only to the authorized users of the femtocell 602. On the other hand, if such a femtocell opportunity exists, then the process may proceed to step 808.

At step 808, the femtocell 602 may obtain certain network performance information corresponding to the operator's network, which can inform the femtocell 602 as to whether a network opportunity 704 exists, wherein the provision of open access to the femtocell 602 would provide a benefit to the operator's network. For example, the network performance information may include macrocell congestion information obtained by the femtocell 602 from the core network, which may be obtained by the femtocell 602 by making an inquiry through its backhaul connection, i.e., utilizing the network communication interface 610. In another example, the femtocell may obtain macrocell congestion information by reading system information blocks (SIBs) that are broadcasted by the macrocell, which may in some cases indicate a level of congestion. Broadly, any suitable information corresponding to network performance, which may assist in the determination of whether to provide an incentive for open access, or whether to open access to the femtocell 602 at a particular time, may be provided to the femtocell 602.

In accordance with the network performance information obtained at step 808, at step 810 the femtocell 602 may determine whether a sharing opportunity exists for the a neighboring macrocell for providing an incentive for open access, or to open access to the femtocell 602, as described above. For example, the processor 604 may determine whether offloading one or more users onto the femtocell 602 would reduce congestion at the macrocell by an amount greater than a suitable threshold, or whether such offloading would reduce interference to a macrocell or to users of the macrocell by an amount greater than a suitable threshold.

If there is no such opportunity, then the process may proceed to step 806, wherein the femtocell 602 may maintain closed access, i.e., by providing access only to the authorized users of the femtocell 602. On the other hand, if such a network opportunity exists, then the process may proceed to step 812, wherein the femtocell 602 may open up access to one or more users outside of the authorized set for the femtocell 602. Here, in some examples wherein the femtocell 602 determines to open up its access, the femtocell 602 itself may make the determination to open access to one or more non-associated UEs. In other examples, the femtocell 602 may receive an instruction from an external node to open up its access, wherein the determination is made at the external node.

In this way, the femtocell 602 may determine whether the "win-win" scenario described above currently exists. That is, when both the femtocell opportunity and the network opportunity exist, the opening of access to the femtocell may be the most desired from both the standpoint of the femtocell 602, and that of the network operator.

When the femtocell 602 opens up access, it may not necessarily open up access to all UEs in its proximity that might be capable of communicating with the femtocell 602 over its air interface. For example, the closed-access femtocell may become a hybrid access femtocell, wherein access may be granted not only to authorized users as conventionally associated with the subscriber, but to one or more other UEs not part of the authorized set of users. Here, the one or more other UEs may be selected by the femtocell 602, e.g., in accordance with one or more characteristics of the particular UEs to which access may be granted. For example, different priorities for access to the femtocell 602 may be granted in accordance with which subscribers have opened up access to their own femtocells, to the subscribers of this femtocell 602.

Once the femtocell 602 has opened up access to one or more non-associated UEs, at step 814, the subscriber may receive an incentive credit. The incentive credit may be received from any suitable source, and may not necessarily be communicated to the femtocell 602 directly, but may simply accrue to the subscriber's account.

Figure 9:
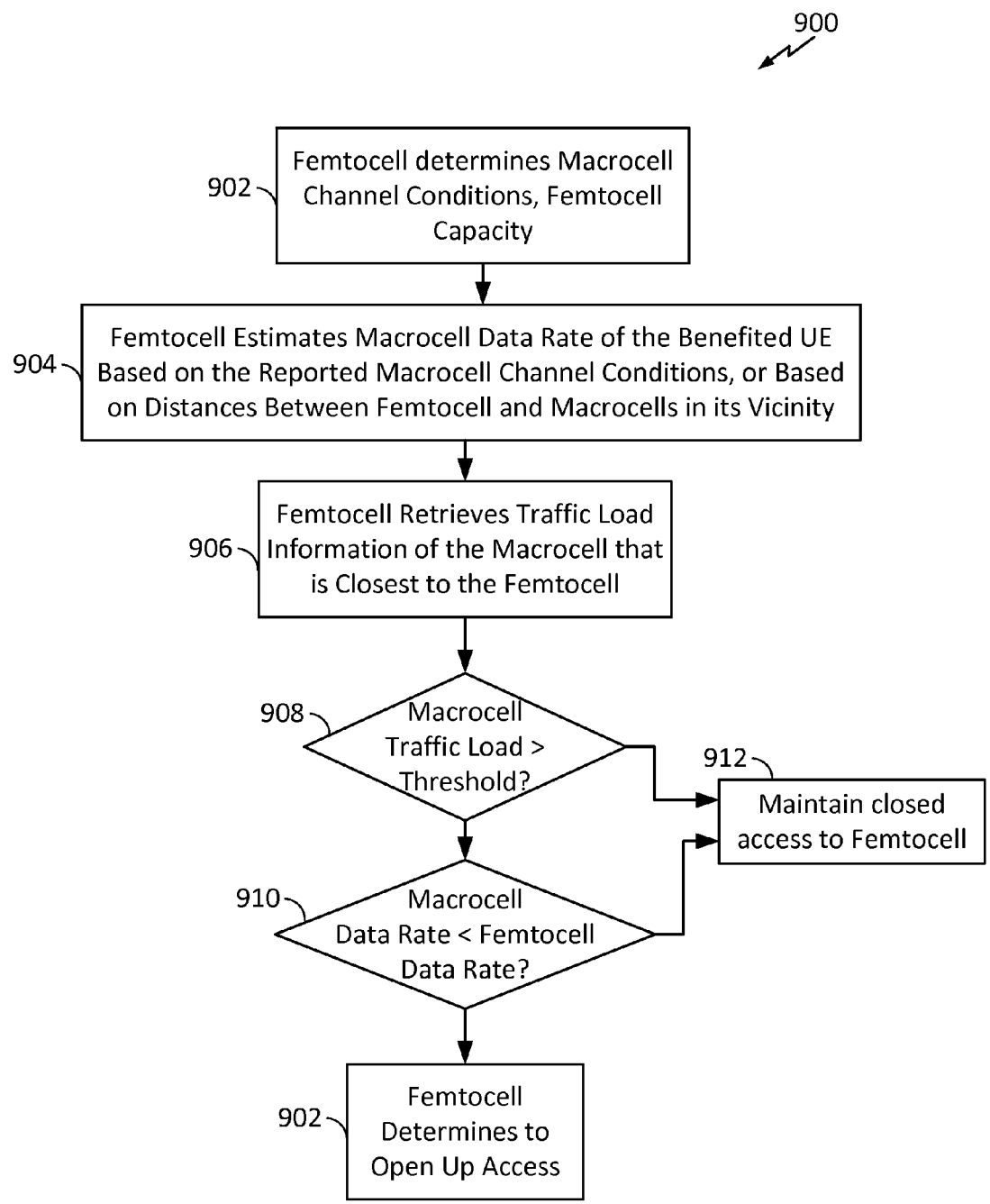
FIG. 9 is a flow chart illustrating a process for a femtocell to determine whether to open access responsive to incentives according to one example.
Figure 10:
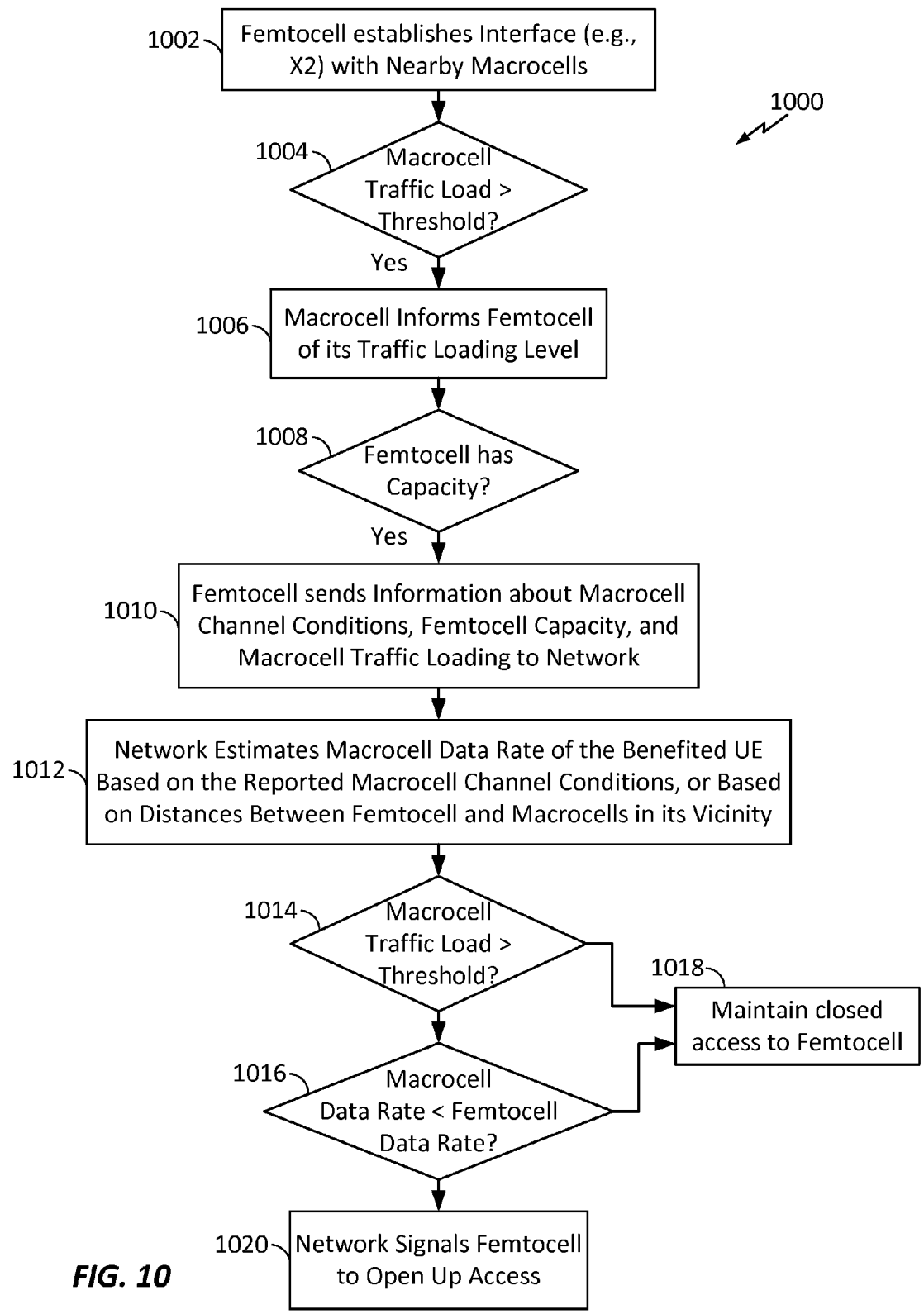
FIG. 10 is a flow chart illustrating a process for a network to determine whether a femtocell opens access responsive to incentives according to one example.

FIGS. 9 and 10 are flow charts illustrating two examples of processes corresponding to step 812, which may be employed for determining whether to open up access to the femtocell 602 in accordance with some aspects of the disclosure. Specifically, referring to FIG. 9, a process 900 is illustrated, wherein the femtocell 602 may utilize access granting operations 620 to autonomously determine whether to open up access, without involvement from the macrocell other than the provision of certain information that may assist the femtocell 602 to make the decision. Referring to FIG. 10, a process 1000 is illustrated, wherein the macrocell or other suitable network node is involved in the determination whether to open up access at the femtocell 602, and may transmit an instruction to the femtocell 602 to open up its air interface to one or more non-associated UEs.

Referring now to FIG. 9, the process 900 may correspond to step 812 in the process 800 illustrated in FIG. 8. At step 902, wherein the femtocell 602 may determine one or more parameters, such as the femtocell performance information obtained at step 802 and/or the network performance information obtained at step 808. For example, the femtocell 602 may utilize the WWAN transceiver 606 to measure characteristics such as channel conditions of a neighboring macrocell at the location of the femtocell 602. Moreover, the femtocell 602 may utilize one or both of backhaul availability determination operations 622 and/or cell loading determination operations 630 to determine whether the femtocell 602 has extra capacity to support opening up access to one or more non-associated UEs. Thereafter, the femtocell 602 may determine whether it has extra capacity, and whether the neighboring macrocell is detected to be busy.

At step 904, the femtocell 602 may estimate the macrocell data rate of a benefited UE (i.e., a UE that may hand over from the macrocell, on which it is currently camped, to the femtocell 602). In some examples, this estimate may be based on the macrocell channel conditions determined by the femtocell 602 at step 902. In another example, this estimate may be based on the distances between the femtocell 602 and the macrocells in its vicinity. Further, at step 906, the femtocell 602 may retrieve traffic load information corresponding to the macrocell that is closest to the femtocell 602.

With this information, at step 908, the femtocell 602 may determine whether the traffic load of the macrocell is greater than a suitable threshold (e.g., a predetermined macrocell loading threshold). Further, at step 910, the femtocell 602 may determine if the macrocell data rate for the UE that may hand over to the femtocell 602, is less than the data rate that may be offered by the femtocell 602. Here, if the answer is no to either of these inquiries, then the process may proceed to step 912, wherein the femtocell 602 may maintain closed access; however, if the answer is yes to both of these inquiries, then the process may proceed to step 914, wherein the femtocell 602 may determine to open up access to its air interface to one or more UEs outside of the authorized set of UEs.

Referring now to FIG. 10, again, the process 1000 may correspond to step 812 in FIG. 8, but in this case, the decision whether to open up access to the femtocell 602 may involve a suitable network node, including but not limited to a macrocell 308, an RNC 306, a node in the core network 304, and/or a server connected to a packet-switched network such as the Internet 322, with reference to FIG. 3.

At step 1002, the femtocell 602 may establish a communication interface, such as an X2 interface (utilized in an LTE network), for communicating with neighboring macrocells. For example, the femtocell 602 may utilize one or both of the network communication interface 610 and/or the intra-femto communication interface 612 for communication over an X2 interface with one or more neighboring macrocells.

With the X2 interface established, the femtocell 602 may obtain information from one or more neighboring macrocells regarding its traffic load level. For example, at step 1004, the macrocell may determine whether its traffic load is greater than a threshold (e.g., a predetermined traffic loading threshold), and if yes, at step 1006 the macrocell may transmit, by way of the X2 interface, to the femtocell 602 its traffic loading level.

At step 1008, the femtocell 602 may determine whether it has capacity to support providing service to one or more non-associated UEs. For example, the femtocell 602 may utilize backhaul availability determination operations 622, interference measurement operations 628, and/or cell loading determination operations 630 to determine whether the femtocell 602 has sufficient capacity to support the one or more non-associated UEs. Here, if the femtocell 602 has sufficient capacity, and the macrocell is reportedly busy, then at step 1010, the femtocell 602 may transmit to the network certain information to assist in a determination as to whether to open up access to the femtocell 602. For example, the femtocell 602 may transmit to the network information corresponding to macrocell channel conditions, femtocell capacity, and/or traffic loading at the reportedly busy macrocell.

At step 1012, the network may estimate the macrocell data rate of a benefited UE (i.e., a UE that may hand over from the macrocell, on which it is currently camped, to the femtocell 602). In some examples, this estimate may be based on the macrocell channel conditions. In another example, this estimate may be based on the distances between the femtocell 602 and the macrocells in its vicinity.

With this information, at step 1014, the network may determine whether the traffic load at the macrocell is greater than a suitable threshold (e.g., a predetermined macrocell loading threshold). Further, at step 1016, the network may determine if the macrocell data rate for the UE that may hand over to the femtocell 602, is less than the data rate that can be offered by the femtocell 602. Here, if the answer is no to either of these inquiries, then the process may proceed to step 1018, wherein the network may instruct the femtocell 602 to maintain closed access; however, if the answer is yes to both of these inquiries, then the process may proceed to step 1020, wherein the network may instruct the femtocell 602 to open up access to its air interface to one or more UEs outside the authorized set of UEs.

Amount of Incentive to Provide

With the incentive schemes described herein, incentives may be offered to a subscriber and/or associated users utilizing one or both of a fixed credit injection scheme or an adaptive credit injection scheme.

With fixed credit injection, the amount of credit given to a subscriber and/or associated users for opening up access to the femtocell 602 may be fixed to a certain amount, configured to be large enough to get the subscriber to open up their femtocell for public use, but small enough not to result in a net loss for the operator. In general, when using a fixed credit injection model, the ratio of macrocell users who own open-access femtocells may increase linearly with an increase in the amount of fixed credit offered to owners of the open access femtocells. However, the network capacity only grows inversely exponentially as the number of open access femtocells increases.

In some aspects of the disclosure, the network operator may provide incentives to the subscriber in an amount that is a function of (e.g., proportional to) the femtocell's contributions to the rest of the network. This scheme may be referred to as adaptive credit injection. For example, when the high-power macrocell is not substantially loaded, there is no need to offload users to nearby femtocells, and accordingly, doing so would not provide much benefit to the rest of the network. On the other hand, when the high-power macrocell is heavily loaded, offloading users to nearby femtocells would provide a benefit to the overall network performance, and thus, incentives for subscribers to open up access to their femtocells at these times would be beneficial.

Here, the femtocell's contributions to the rest of the network may be quantified in accordance with (1) the over-capacity or congestion at the macrocell, and/or (2) the severity of interference between the macrocell and the femtocell. That is, the femtocell's contribution to the network may be a function of an amount of reduction in capacity or congestion at the macrocell, or an amount of reduction in interference between the macrocell and the femtocell.

With adaptive credit injection, the operator may only give a suitable amount of credit to incentivize the giving of open access, to reduce or prevent the giving of too much credit when additional grants of open access would not help the network. Here, the amount of credit to offer may depend upon one or more of various parameters, for example: the macrocell data rate of the benefited subscriber (i.e., the UE who hands over to the open access femtocell); the average macrocell data rate; the amount of traffic of the benefited UE served by the femtocell 602; the network total traffic load; or the value per traffic bit.

Types of Incentives

The various incentive schemes described herein may provide any one or more of various types of incentives to a subscriber to motivate the subscriber to open up access to their femtocell 602. For example, some types of incentives, described herein, may include operator incentives, self-incentives, and/or distributed incentives.

Operator incentives, which might also be referred to as centralized incentives, include incentives offered to the subscriber and/or its associated users from the operator of the network to which the femtocell provides access. Operator incentives may come in several different forms. For example, a subscriber may be offered a premium usable when that subscriber, or other users associated with the subscriber, access macrocells on the subscriber's network. Here, when the subscriber or associated users leave the vicinity of their femtocell, they may receive an additional or increased data quota, an increased minimum data rate guarantee provided by the macrocell, a higher ARP, etc. In another example, the subscriber or associated users may receive free or reduced-price Wi-Fi hotspot access at locations such as airports, coffee shops, etc. In yet another example, the subscriber or associated users may receive certain reward points, which may be used for purchasing goods or services with the operator's business partners, not necessarily relating to usage of the cellular communications network. In yet another example, the femtocell for which open access is granted may be offered a higher backhaul data rate. Here, the backhaul operator (e.g., the user's Internet service provider) and the wireless network operator may be the same entity, or in a partnership with one another.

In various examples, such operator incentives may be based on the amount of usage that the subscriber/owner grants to non-associated users, as well as the time of the day when such usage was granted.

Self incentives include incentives that inherently accrue to a subscriber or associated users, by virtue of opening access to the femtocell to non-associated users. For example, if nearby UEs are camped on a neighboring macrocell, those UEs may be transmitting at a relatively high power, potentially resulting in large amounts of interference to the subscriber or associated users attempting to utilize the femtocell. Thus, the owner of a femtocell may wish to open up access to others, such that the QoS or QoE offered to the subscriber or associated users is higher, due to the reduction in interference.

Distributed incentives include incentives that are generally determined jointly, in a coordinated effort by and/or between two or more femtocells. For example, a distributed incentive may include granting prioritized scheduling at one femtocell, for subscribers or their associated users who have opened up their own femtocells for others to use. In another example, a femtocell may offer interference mitigation to subscribers or their associated users of neighboring femtocells, when the subscriber or associated users of a neighboring femtocell can access the offering femtocell.

Distributed Incentives

According to some aspects of the disclosure, the femtocell 602 may be configured to determine distributed incentives, as described above. Here, to facilitate coordination between a plurality of femtocells (e.g., for the determination of distributed incentives as described in further detail below), in an aspect of the disclosure, the femtocell 602 may include an intra-femto communication interface 612. The intra-femto communication interface 612 may be any suitable wired or wireless communication interface, and in some examples, may be integral with the network communication interface 610, while in other examples, maybe a separate, dedicated intra-femto communication interface.

Figure 11:
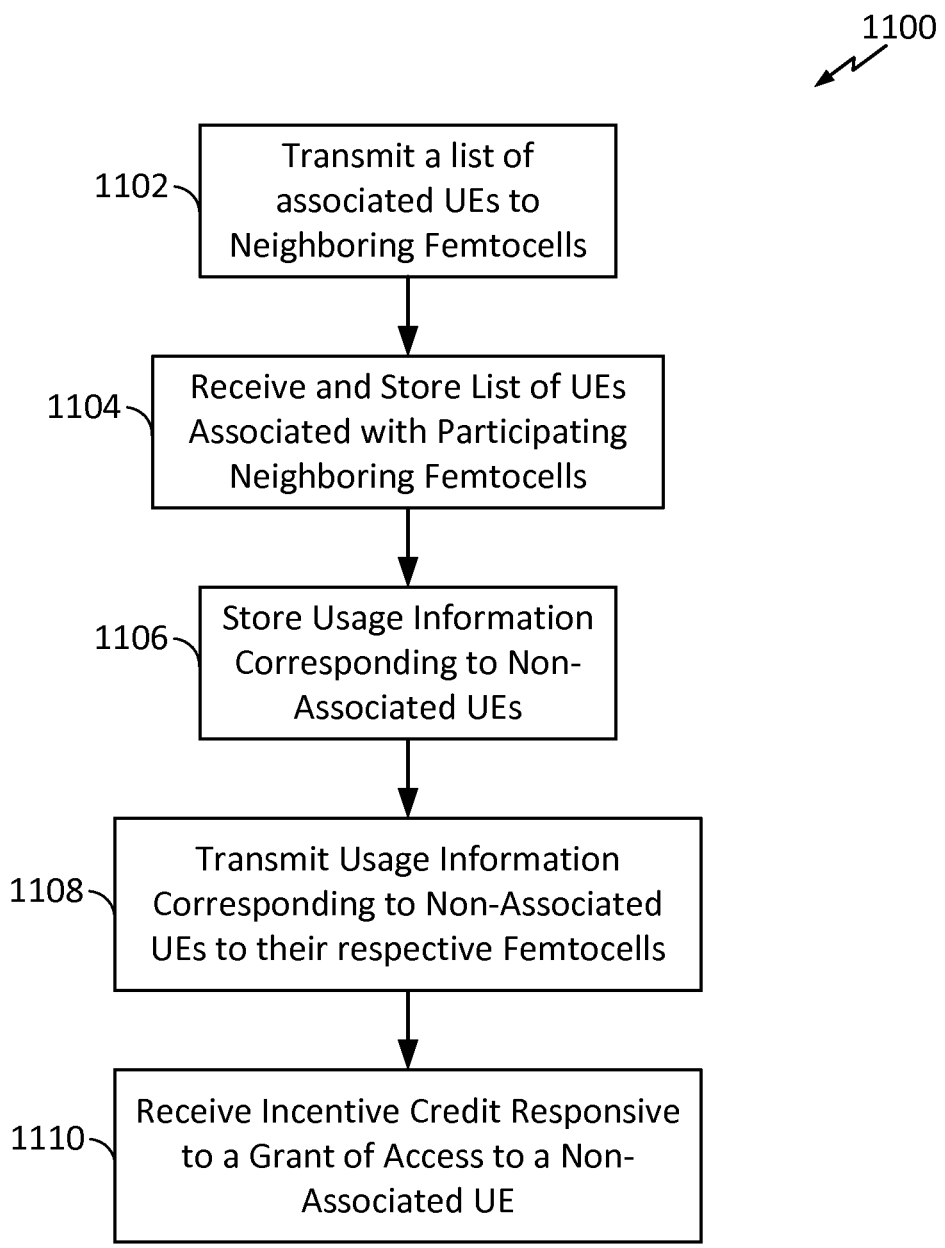
FIG. 11 is a flow chart illustrating a process for determining an amount of incentives in a distributed fashion in accordance with one example.

FIG. 11 is a flow chart illustrating an exemplary process 1100 operable at a femtocell 602 for determining distributed incentives in accordance with one or more aspects of the disclosure.

At step 1102, the femtocell 602 may transmit a list of its associated UEs to neighboring femtocells. That is, the femtocell 602 may utilize one or both of the intra-femto communication interface 612 and/or the network communication interface 610 to communicate a list of its associated mobile devices (e.g., those UEs that are part of a closed subscriber group CSG or otherwise associated with the femtocell 602) to one or more neighboring femtocells and/or to the network. Similarly, at step 1104, the femtocell 602 may receive and store (e.g., at the non-associated UE usage information block 626) a list of UEs associated with participating neighboring femtocells. In this way, the femtocell 602 can be enabled to prioritize those UEs for access to its air interface resources.

Furthermore, each femtocell 602 may take into account the usage a specific neighboring femtocell grants to users of that femtocell 602. To this end, at step 1106, when the femtocell 602 grants access to a non-associated UE, the femtocell 602 may store non-associated UE usage information 626 in its memory 608. Further, at step 1108, the femtocell 602 may transmit the non-associated UE usage information to respective femtocells, e.g., utilizing the intra-femto communication interface 612. In this way, femtocells may share information about usage granted to one another's' associated users, which each femtocell may accordingly utilize in determining whether incentives are earned by a particular femtocell (e.g., for granting access to other femtocells' associated UEs), and/or whether to open its access to a particular UE corresponding to a neighboring femtocell. Of course, in various aspects of the disclosure, "neighboring femtocell" might not necessarily be very closely located to a particular femtocell, and might be any other femtocell in the network.

With this information, incentives may be determined by the femtocells in a coordinated, distributed fashion, such that the femtocells can provide group access for UEs belonging to the neighbor/partner femtocells, wherein certain UEs can be provided better QoS than what they might otherwise get from the macrocell, or other suitable incentives may be provided.

Thus, at step 1110, the femtocell 602 may receive a corresponding incentive credit responsive to granting access to one or more UEs associated with a partnered femtocell.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In particular, one or more aspects of the disclosure may be implemented in a system employing LTE-Advanced. That is, in 3GPP Release 8 and 9 standards for eUTRA (LTE), an inter-cell interference coordination (ICIC, also called inter-cell interference cancellation) framework was introduced, enabling certain radio resource management protocols to reduce inter-cell interference. Here, the assignment of resources in the time and frequency domain, as well as transmission power schemes, can be coordinated among neighboring cells utilizing their X2 interface, such that UEs at a cell edge are less likely to be assigned the same resources as those being transmitted by a neighbor cell. In this way, interference from the neighboring cell that might adversely affect the UE at the cell edge can be reduced.

In LTE Advanced (i.e., Release 10 standards for eUTRA), an enhanced ICIC framework (eICIC) was introduced, extending ICIC to deal with interference issues in heterogeneous networks. As in the Release 8 ICIC framework, eICIC utilizes power, frequency, and time domain resource coordination to reduce interference from neighboring cells. In addition, eICIC introduced the concept of an almost blank subframe (ABS), in which a macrocell can configure an ABS to carry only control information at a very low power, such that neighboring or overlapping low-power cells can utilize those same subframes to transmit their data, reducing or avoiding interference from the macrocell.

Furthermore, LTE Advanced includes the concept of cell range extension (CRE), wherein a UE is provided with the capability to remain connected with a low-power cell in low SINR scenarios, effectively increasing the range of the low-power cell. This cell range extension is generally enabled with the use of a more advanced receiver at the UE and downlink interference cancellation schemes.

In accordance with an aspect of the present disclosure, this interference coordination/cancellation framework may be exploited to provide implicit incentives to open up access to a femtocell. Here, "implicit" is intended to encompass incentives that do not include direct, monetary or equivalent compensation to the femtocell owner, but generally include benefits or advantages that can be granted to the open access femtocell users and/or owner. For example, the eICIC framework, described above, and/or the range extension feature, may be enabled when a femtocell opens up access to non-associated UEs. In this way, throughput for UEs utilizing the open access femtocell can be increased, relative to that available for a closed access femtocell.

That is, in accordance with an aspect of the disclosure, due to the incentives offered for opening up access to non-associated UEs, open access femtocells can support higher nominal/peak throughput, offering a better user experience.

For example, while a closed-access femtocell might only offer its UEs 10 Mbps throughput, in an aspect of the disclosure, by virtue of the eICIC framework, an open-access femtocell might be offered 20 Mbps throughput.

Further, by virtue of enabling LTE-A range extension for open access femtocells, which results in a wider coverage area for the open access femtocell, the users of the open access femtocell can remain within the coverage area of the femtocell more often. In many cases, data usage within a private femtocell is not deducted from the monthly data quota allocated to a user according to their subscription. Thus, because these users more often use their femtocell, without utilizing their quota of data or minutes, this can result in an "effective" data quota increase.

FIG. 12 is a schematic illustration of an incentive scheme utilizing eICIC and range extension in accordance with an aspect of the disclosure. Here, this incentive scheme may be utilized in the place of, or in addition to, any one or more of the incentive schemes described above.

In this illustration, a macrocell 1202 is shown at the center of its service area, designated by the large circle 1204. Within the service area 1204 are located two femtocells: a closed access femtocell 1206, and an open access femtocell 1208. Each of these femtocells is encircled with its service area 1210 and 1212, respectively. However, as described above, in accordance with an aspect of the disclosure, as an incentive for opening up access to the femtocell, the open access femtocell 1208 is additionally encircled by an extended service area 1214.

Several UEs are illustrated being located throughout the service area 1204. For example, a "macro UE" 1216 is shown, wherein the macro UE is being provided service by the macrocell 1202. Also illustrated is a "closed femto UE" 1218, wherein the closed femto UE is being provided service by the closed access femtocell 1206. Further, an "open femto UE" 1220 is illustrated in the service area of the open access femtocell 1208, and an "open femto CRE UE" 1222 is illustrated in the extended-range service area of the open access femtocell 1208.

Also illustrated at the right-hand side of FIG. 12 is an illustration showing example of a frame for each of the macro UE 1216, the closed femto UE 1218, the open femto UE 1220, and the open femto CRE UE 1222.

As seen in these illustrations, each frame is labeled with 8 subframes, labeled 0-7. In the illustrated example, the macro UE 1216 is assigned subframes 0-2 (as indicated by the grayed-out subframes), and the closed femto UE 1218 is assigned subframes 3-7. Thereby, with these subframe assignments, interference between the macrocell 1202 and the closed femtocell 1206 can be substantially reduced; however, clearly a reduction in the throughput may arise.

Accordingly, in an aspect of the disclosure, as an incentive granted to the open access femtocell 1208 for granting open access to one or more non-associated UEs, the open femto UE 1220 in the standard service area of the open access femtocell 1208 can be assigned data in all subframes 0-7, as illustrated. That is, because the closed femtocell 1206 has not offered open access to non-associated UEs, the closed femtocell 1206 may not be enabled to utilize all subframes 0-7 for its associated UEs. However, in one example, by enabling eICIC for the open femtocell 1208, or in another example, otherwise authorizing the UE to utilize additional resources in at least a part of the low-power base station's cell coverage area, in return for its opening up of access to non-associated UEs, a greater number of subframes can be utilized by a UE 1220 in the standard service area 1212 of the open access femtocell 1208, thereby enabling increased throughput for that UE.

In a further aspect of the disclosure, the open femto CRE UE is a UE in a service area corresponding to the LTE-Advanced Cell Range Extension (CRE) feature, described above. As illustrated in this example, the UE 1222 utilizing the range extension feature can be assigned subframes 3-7, such that interference with the macro UE 1216 (which, in this example, as described above is assigned subframes 0-2) can be reduced. Here, by enabling cell range extension for the open access femtocell 1208 in return for opening up access to one or more non-associated UEs, users (such as the open femto CRE UE 122) of the open access femtocell 1208 can not only reduce data usage corresponding to their subscription to utilize the macrocell 1202, but they can additionally have potentially increased throughput relative to macro UEs 1216.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication operable at a low-power base station, comprising:
    determining that a sharing opportunity exists at the low-power base station;
    determining that a sharing opportunity exists at a neighboring macrocell;
    providing access to an air interface provided by the low-power base station to a user equipment (UE) outside of a set of UEs associated with the low-power base station, wherein the user equipment (UE) is associated with the neighboring macrocell; and
    receiving an incentive credit responsive to the providing of access to the air interface.

2. The method of claim 1, wherein the determining that the sharing opportunity exists at the low-power base station comprises:
    determining that greater than a threshold amount of residual backhaul capacity is available for the low-power cell.

3. The method of claim 1, wherein the determining that the sharing opportunity exists at the low-power base station comprises:
    determining that interference to the air interface will be reduced by the providing of access to the air interface to the UE outside of the set of UEs associated with the low-power base station.

4. The method of claim 1, wherein the determining that the sharing opportunity exists at the neighboring macrocell comprises:
    determining that offloading the UE from the neighboring macrocell to the low-power base station will reduce congestion or interference at the neighboring macrocell by an amount greater than a predetermined threshold.

5. The method of claim 1, wherein the incentive credit comprises:
    an additional or increased data quota for use at a network corresponding to the neighboring macrocell; an increased minimum data rate guarantee provided by the network corresponding to the neighboring macrocell; a reduced price or credit for Wi-Fi hotspot access; reward points or credit for purchasing goods or services; or a higher data rate for backhaul communications at the low-power base station.

6. The method of claim 1, wherein the incentive credit comprises an incentive determined at least in part by the low-power base station with which the UE is associated.

7. The method of claim 6, wherein the incentive credit comprises prioritized scheduling or interference mitigation at the low-power base station with which the UE is associated.

8. The method of claim 1, wherein the incentive credit is in an amount that is a function of an amount of contribution to a network corresponding to the neighboring macrocell, provided by the providing of access to the air interface.

9. The method of claim 8, wherein the amount of contribution to the network corresponds to an amount of reduction in capacity or congestion at the neighboring macrocell resulting from the providing of access to the air interface, or an amount of reduction in interference between the neighboring macrocell and the low-power base station resulting from the providing of access to the air interface.

10. The method of claim 1, wherein the incentive credit comprises authorization to enable an enhanced inter-cell interference coordination (eICIC) feature defined in a 3GPP release 10 or later specification.

11. The method of claim 1, wherein the incentive credit comprises authorization to utilize additional radio resources in at least a part of the low-power base station's cell coverage area.

12. The method of claim 1, wherein the incentive credit comprises authorization to enable a cell range extension feature defined in a 3GPP release 10 or later specification.

13. A method for incentivizing the provision of access to a low-power base station, comprising:
    receiving, from a first low-power base station, a list of one or more user equipment (UEs) associated with the first low-power base station, wherein the one or more UEs is part of a closed subscriber group (CSG);
    transmitting, from a second low-power base station, usage information corresponding to a grant of access, at the second low-power base station, to a UE from among the one or more UEs associated with the first low-power base station; and
    receiving an incentive credit responsive to the grant of access to the UE associated with the first low-power base station.

14. A low-power base station configured for wireless communication, comprising:
    means for determining that a sharing opportunity exists at the low-power base station;
    means for determining that a sharing opportunity exists at a neighboring macrocell;
    means for providing access to an air interface provided by the low-power base station to a user equipment (UE) outside of a set of UEs associated with the low-power base station, wherein the user equipment (UE) is associated with the neighboring macrocell; and
    means for receiving an incentive credit responsive to the providing of access to the air interface.

15. The low-power base station of claim 14, wherein the means for determining that the sharing opportunity exists at the low-power base station comprises:
    means for determining that greater than a threshold amount of residual backhaul capacity is available for the low-power cell.

16. The low-power base station of claim 14, wherein the means for determining that the sharing opportunity exists at the low-power base station comprises:
    means for determining that interference to the air interface will be reduced by the providing of access to the air interface to the UE outside of the set of UEs associated with the low-power base station.

17. The low-power base station of claim 14, wherein the means for determining that the sharing opportunity exists at the neighboring macrocell comprises:
    means for determining that offloading the UE from the neighboring macrocell to the low-power base station will reduce congestion or interference at the neighboring macrocell by an amount greater than a predetermined threshold.

18. The low-power base station of claim 14, wherein the incentive credit comprises:
an additional or increased data quota for use at a network corresponding to the neighboring macrocell; an increased minimum data rate guarantee provided by the network corresponding to the neighboring macrocell; a reduced price or credit for Wi-Fi hotspot access; reward points or credit for purchasing goods or services; or a higher data rate for backhaul communications at the low-power base station.

19. The low-power base station of claim 14, wherein the incentive credit comprises an incentive determined at least in part by the low-power base station with which the UE is associated.

20. The low-power base station of claim 19, wherein the incentive credit comprises prioritized scheduling or interference mitigation at the low-power base station with which the UE is associated.

21. The low-power base station of claim 14, wherein the incentive credit is in an amount that is a function of an amount of contribution to a network corresponding to the neighboring macrocell, provided by the providing of access to the air interface.

22. The low-power base station of claim 21, wherein the amount of contribution to the network corresponds to an amount of reduction in capacity or congestion at the neighboring macrocell resulting from the providing of access to the air interface, or an amount of reduction in interference between the neighboring macrocell and the low-power base station resulting from the providing of access to the air interface.

23. The low-power base station of claim 14, wherein the incentive credit comprises authorization to enable an enhanced inter-cell interference coordination (eICIC) feature defined in a 3GPP release 10 or later specification.

24. The low-power base statin of claim 14, wherein the incentive credit comprises authorization to utilize additional radio resources in at least a part of the low-power base station's cell coverage area.

25. The low-power base station of claim 14, wherein the incentive credit comprises authorization to enable a cell range extension feature defined in a 3GPP release 10 or later specification.

26. A low-power base station configured for incentivizing the provision of access to the low-power base station, comprising:
means for receiving, from a first low-power base station, a list of one or more user equipment (UEs) associated with the first low-power base station, wherein the one or more UEs is part of a closed subscriber group (CSG);
means for transmitting, from a second low-power base station, usage information corresponding to a grant of access, at the second low-power base station, to a UE from among the one or more UEs associated with the first low-power base station; and
means for receiving an incentive credit responsive to the grant of access to the UE associated with the first low-power base station.

27. A low-power base station configured for wireless communication, comprising:
at least one processor;
a memory communicatively coupled to the at least one processor; and
a communication interface communicatively coupled to the at least one processor for communicating with one or more user equipment (UE) over an air interface,
wherein the at least one processor is configured to:
determine that a sharing opportunity exists at the low-power base station;
determine that a sharing opportunity exists at a neighboring macrocell;
provide access to the air interface to a UE outside of a set of UEs associated with the low-power base station, wherein the UE is associated with the neighboring macrocell; and
receive an incentive credit responsive to the providing of access to the air interface.

28. The low-power base station of claim 27, wherein the at least one processor, being configured to determine that the sharing opportunity exists at the low-power base station, is further configured to determine that greater than a threshold amount of residual backhaul capacity is available for the low-power cell.

29. The low-power base station of claim 27, wherein the at least one processor, being configured to determine that the sharing opportunity exists at the low-power base station, is further configured to determine that interference to the air interface will be reduced by the providing of access to the air interface to the UE outside of the set of UEs associated with the low-power base station.

30. The low-power base station of claim 27, wherein the at least one processor, being configured to determine that the sharing opportunity exists at the neighboring macrocell, is further configured to determine that offloading the UE from the neighboring macrocell to the low-power base station will reduce congestion or interference at the neighboring macrocell by an amount greater than a predetermined threshold.

31. The low-power base station of claim 27, wherein the incentive credit comprises:
an additional or increased data quota for use at a network corresponding to the neighboring macrocell; an increased minimum data rate guarantee provided by the network corresponding to the neighboring macrocell; a reduced price or credit for Wi-Fi hotspot access; reward points or credit for purchasing goods or services; or a higher data rate for backhaul communications at the low-power base station.

32. The low-power base station of claim 27, wherein the incentive credit comprises an incentive determined at least in part by the low-power base station with which the UE is associated.

33. The low-power base station of claim 32, wherein the incentive credit comprises prioritized scheduling or interference mitigation at the low-power base station with which the UE is associated.

34. The low-power base station of claim 27, wherein the incentive credit is in an amount that is a function of an amount of contribution to a network corresponding to the neighboring macrocell, provided by the providing of access to the air interface.

35. The low-power base station of claim 34, wherein the amount of contribution to the network corresponds to an amount of reduction in capacity or congestion at the neighboring macrocell resulting from the providing of access to the air interface, or an amount of reduction in interference between the neighboring macrocell and the low-power base station resulting from the providing of access to the air interface.

36. The low-power base station of claim 27, wherein the incentive credit comprises authorization to enable an enhanced inter-cell interference coordination (eICIC) feature defined in a 3GPP release 10 or later specification.

37. The low-power base station of claim 27, wherein the incentive credit comprises authorization to utilize additional radio resources in at least a part of the low-power base station's cell coverage area.

38. The low-power base station of claim 27, wherein the incentive credit comprises authorization to enable a cell range extension feature defined in a 3GPP release 10 or later specification.

39. A low-power base station configured for incentivizing the provision of access to the low-power base station, comprising:
   at least one processor;
   a memory communicatively coupled to the at least one processor;
   a communication interface communicatively coupled to the at least one processor for communicating with one or more user equipment (UE) over an air interface; and
   an intra-femto communication interface for communicating with one or more external low-power base stations,
   wherein the at least one processor is configured to:
      receive, from a first low-power base station, a list of one or more UEs associated with the first low-power base station, wherein the one or more UEs is part of a closed subscriber group (CSG);
      transmit, from a second low-power base station, usage information corresponding to a grant of access, at the second low-power base station, to a UE from among the one or more UEs associated with the first low-power base station; and
      receive an incentive credit responsive to the grant of access to the UE associated with the first low-power base station.

40. A non-transitory computer-readable storage medium operable at a low-power base station configured for wireless communication, comprising:
   instructions for causing a computer to determine that a sharing opportunity exists at the low-power base station;
   instructions for causing a computer to determine that a sharing opportunity exists at a neighboring macrocell;
   instructions for causing a computer to provide access to the air interface to a UE outside of a set of UEs associated with the low-power base station, wherein the UE is associated with the neighboring macrocell; and
   instructions for causing a computer to receive an incentive credit responsive to the providing of access to the air interface.

41. The non-transitory computer-readable storage medium of claim 40, wherein the instructions for causing a computer to determine that the sharing opportunity exists at the low-power base station, comprise instructions for causing a computer to determine that greater than a threshold amount of residual backhaul capacity is available for the low-power cell.

42. The non-transitory computer-readable storage medium of claim 40, wherein the instructions for causing a computer to determine that the sharing opportunity exists at the low-power base station, comprise instructions for causing a computer to determine that interference to the air interface will be reduced by the providing of access to the air interface to the UE outside of the set of UEs associated with the low-power base station.

43. The non-transitory computer-readable storage medium of claim 40, wherein the instructions for causing a computer to determine that the sharing opportunity exists at the neighboring macrocell, comprise instructions for causing a computer to determine that offloading the UE from the neighboring macrocell to the low-power base station will reduce congestion or interference at the neighboring macrocell by an amount greater than a predetermined threshold.

44. The non-transitory computer-readable storage medium of claim 40, wherein the incentive credit comprises:
   an additional or increased data quota for use at a network corresponding to the neighboring macrocell; an increased minimum data rate guarantee provided by the network corresponding to the neighboring macrocell; a reduced price or credit for Wi-Fi hotspot access; reward points or credit for purchasing goods or services; or a higher data rate for backhaul communications at the low-power base station.

45. The non-transitory computer-readable storage medium of claim 40, wherein the incentive credit comprises an incentive determined at least in part by the low-power base station with which the UE is associated.

46. The non-transitory computer-readable storage medium of claim 45, wherein the incentive credit comprises prioritized scheduling or interference mitigation at the low-power base station with which the UE is associated.

47. The non-transitory computer-readable storage medium of claim 40, wherein the incentive credit is in an amount that is a function of an amount of contribution to a network corresponding to the neighboring macrocell, provided by the providing of access to the air interface.

48. The non-transitory computer-readable storage medium of claim 47, wherein the amount of contribution to the network corresponds to an amount of reduction in capacity or congestion at the neighboring macrocell resulting from the providing of access to the air interface, or an amount of reduction in interference between the neighboring macrocell and the low-power base station resulting from the providing of access to the air interface.

49. The non-transitory computer-readable storage medium of claim 40, wherein the incentive credit comprises authorization to enable an enhanced inter-cell interference coordination (eICIC) feature defined in a 3GPP release 10 or later specification.

50. The non-transitory computer-readable storage medium of claim 40, wherein the incentive credit comprises authorization to utilize additional radio resources in at least a part of the low-power base station's cell coverage area.

51. The non-transitory computer-readable storage medium of claim 40, wherein the incentive credit comprises authorization to enable a cell range extension feature defined in a 3GPP release 10 or later specification.

52. A non-transitory computer-readable storage medium operable at a low-power base station configured for incentivizing the provision of access to the low-power base station, comprising:
   instructions for causing a computer to receive, from a first low-power base station, a list of one or more user equipment (UEs) associated with the first low-power base station, wherein the one or more UEs is part of a closed subscriber group (CSG);
   instructions for causing a computer to transmit, from a second low-power base station, usage information corresponding to a grant of access, at the second low-power base station, to a UE from among the one or more UEs associated with the first low-power base station; and
   instructions for causing a computer to receive an incentive credit responsive to the grant of access to the UE associated with the first low-power base station.

* * * * *

UNITED STATES PATENT AND TRADEMARK OFFICE
CERTIFICATE OF CORRECTION

| | |
|---|---|
| PATENT NO. | : 9,042,218 B2 |
| APPLICATION NO. | : 13/789650 |
| DATED | : May 26, 2015 |
| INVENTOR(S) | : Samir Salib Soliman et al. |

Page 1 of 1

It is certified that error appears in the above-identified patent and that said Letters Patent is hereby corrected as shown below:

Title page item 72

In the list of inventors, please correct the inventor name "Samir Salib SOLIMAN SR." to --Samir Salib SOLIMAN--.

Signed and Sealed this
Twentieth Day of October, 2015

Michelle K. Lee
*Director of the United States Patent and Trademark Office*